United States Patent
Sole Rojals et al.

(10) Patent No.: US 8,913,666 B2
(45) Date of Patent: *Dec. 16, 2014

(54) ENTROPY CODING COEFFICIENTS USING A JOINT CONTEXT MODEL

(75) Inventors: Joel Sole Rojals, La Jolla, CA (US); Rajan L. Joshi, San Diego, CA (US); Marta Karczewicz, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 337 days.

This patent is subject to a terminal disclaimer.

(21) Appl. No.: 13/249,079

(22) Filed: Sep. 29, 2011

(65) Prior Publication Data

US 2012/0082232 A1   Apr. 5, 2012

Related U.S. Application Data

(60) Provisional application No. 61/389,170, filed on Oct. 1, 2010.

(51) Int. Cl.
- *H04N 11/04* (2006.01)
- *H04N 19/13* (2014.01)
- *H04N 19/176* (2014.01)
- *H04N 19/14* (2014.01)
- *H04N 19/146* (2014.01)
- *H04N 19/91* (2014.01)
- *H04N 19/132* (2014.01)
- *H04N 19/18* (2014.01)

(52) U.S. Cl.
CPC ... *H04N 19/00169* (2013.01); *H04N 19/00121* (2013.01); *H04N 19/00278* (2013.01); *H04N 19/00157* (2013.01); *H04N 19/00951* (2013.01); *H04N 19/00127* (2013.01); *H04N 19/00296* (2013.01)
USPC ................................... 375/240.18

(58) Field of Classification Search
USPC ............... 375/240, 240.02, 240.18–240.23, 375/240.12; 382/239
See application file for complete search history.

(56) References Cited

U.S. PATENT DOCUMENTS

| | | |
|---|---|---|
| 5,452,103 A | 9/1995 | Brusewitz |
| 2004/0066974 A1 | 4/2004 | Karczewicz et al. |

(Continued)

FOREIGN PATENT DOCUMENTS

| | | |
|---|---|---|
| EP | 2257072 A1 | 12/2010 |
| JP | 2004064725 A | 2/2004 |
| WO | WO2011142817 A1 | 11/2011 |

OTHER PUBLICATIONS

U.S. Appl. No. 13/249,020, by Joel Sole Rojals, filed Sep. 29, 2011.

(Continued)

*Primary Examiner* — Tung Vo
*Assistant Examiner* — Rowina Cattungal
(74) *Attorney, Agent, or Firm* — Shumaker & Sieffert, P.A.

(57) ABSTRACT

This disclosure describes techniques for performing entropy encoding and decoding of video coefficients using a joint context model shared between transform units having different sizes. For example, the joint context model may be shared between transform units having a first size of 32×32 and transform units having a second size of 16×16. Performing entropy coding using a joint context model shared between transform units having different sizes may reduce an amount of memory necessary to store contexts and probabilities, and reduce computational costs of maintaining context models. In one example, the joint context model may be shared between transform units having the first size with coefficients zeroed out to generate a retained coefficient block having the second size and transform units having the second size. In another example, the joint context model may be shared between transform units having the first size and transform units having the second size.

34 Claims, 7 Drawing Sheets

(56) References Cited

U.S. PATENT DOCUMENTS

| | | | |
|---|---|---|---|
| 2005/0058355 | A1 | 3/2005 | Mitchell et al. |
| 2005/0123207 | A1* | 6/2005 | Marpe et al. ............... 382/239 |
| 2009/0028239 | A1 | 1/2009 | Schuur et al. |
| 2009/0232204 | A1* | 9/2009 | Lee et al. ............... 375/240.02 |
| 2012/0082212 | A1 | 4/2012 | Sadafale et al. |
| 2012/0128066 | A1 | 5/2012 | Shibahara et al. |
| 2012/0134408 | A1* | 5/2012 | Shibahara et al. ............ 375/240 |
| 2013/0003856 | A1 | 1/2013 | Saxena et al. |
| 2013/0114732 | A1 | 5/2013 | Dong et al. |
| 2013/0117343 | A1 | 5/2013 | Budagavi |
| 2013/0142248 | A1 | 6/2013 | Cook et al. |
| 2013/0195177 | A1 | 8/2013 | Hong et al. |

OTHER PUBLICATIONS

Davies et al., "Suggestion for a Test Model", 1. JCT-VC Meeting, Apr. 15, 2010-Apr. 23, 2010, Dresden, (Jointcollaborative Team on Video Coding of ISO/IECJTCI/SC29/WGII and ITU-TSG.16), pp. 30, May 7, 2010, XP030007526.

International Search Report and Written Opinion—PCT/US2011/054425—ISA/EPO—Jan. 11, 2012.

Marpe D., et al., "Context-based adaptive binary arithmetic coding in the H.264/AVC video compression standard", IEEE Transactions on Circuits and Systems for Video Technology, IEEE Service Center, Piscataway, NJ, US, vol. 13, No. 7, Jul. 1, 2003, pp. 620-636, XP011099255, ISSN: 1051-8215, DOI:10.1109/TCSVT.2003.815173 abstract Sections II.B, III.B.

Sole J., et al., "Reduced complexity 32×32 transform by coefficient zero-out", 3. JCT-VC Meeting; 94. MPEG Meeting; Jul. 10, 2010-Oct. 15, 2010; Guangzhou; (Joint Collaborative Team on Video Coding of ISO/IECJTC1/SC29/WG11 and ITU-T SG.16), No. JCTVC-C237, Oct. 2, 2010, XP030007944, ISSN: 0000-0019 the whole document.

Chen et al., "A Fast Computational Algorithm for the Discrete Cosine Transform," IEEE Transactions on Communications, vol. com-25, No. 9, Sep. 1977, pp. 1004-1009.

Wasilewski et al., "Adaptive Segmentation of Wavelet Transform Coefficients for Video Compression," Proceedings of the SPIE—The International Society for Optical Engineering, v3974, 691-9, Jan. 25-28, 2000.

Zhou, "Coding efficiency test on large block size transforms in HEVC," Document JCTVC-B028, 2nd Meeting: Geneva, CH, Jul. 21-28, 2010, 3 pp.

Zhou et al., "TE 12: Evaluation of Transform Unit (TU) Size," Document JCTVC-C056, 3rd Meeting: Guangzhou, CN, Oct. 7-15, 2010, 9 pp.

Sasai et al., "CE11: Context size reduction for the significance map (JCTVC-D185)," Document JCTVC-E227, 5th Meeting: Geneva, CH, Mar. 16-23, 2011, 6 pp.

Sasai et al., "Modification to JCTVC-E227 in CE11 for reduced dependency with MDCS," Document JCTVC-E489, WG11 No. m20208, 5th Meeting: Geneva, CH, Mar. 16-23, 2011, 2 pp.

Chen et al., "A low-complexity computation scheme of discrete cosine transform and quantization with adaptation to block contents", Proceedings of the 2000 IEEE International Symposium on Circuits and Systems, Piscataway, NJ, vol. 1, May 1, 2000, pp. I-631-I-634.

Ding et al., "H.263 Based Facial Image Compression for Low Bitrate Communications," IEEE Proceedings of Conference on Communications, Power and Computing, Winnipeg, MB, May 22-23, 1997, pp. 30-34.

First Office Action and English translation from corresponding Japanese Patent Application No. 2013-531941, mailing date is Jun. 10, 2014 (7 pages).

Bross, et al., "WD4: Working Draft 4 of High-Efficiency Video Coding," JCTVC-F803_d2, (JCT-VC) of ITU-T SG16 WP3 and ISO/IEC JTC1/SC29/WG11 Joint Collaborative Team on Video Coding, 6th Meeting, Torino, IT, Jul. 14-22, 2011, 226 pages.

International Preliminary Report on Patentability—PCT/US2011/054425—The International Bureau of WIPO Geneva, Switzerland, Nov. 21, 2012, 7 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand, T., et al., "WD3: Working Draft 3 of High-Efficiency Video Coding," Document JCTVC-E603, 5th Meeting: Geneva, CH, Mar. 16-23, 2011, pp. 193.

Wiegand et al., "WD1: Working Draft 1 of High-Efficiency Video Coding", JCTVC-C403, 3rd Meeting: Guangzhou, CN, Oct. 7-15, 2010, 137 pp.

Second Written Opinion from corresponding PCT Application Serial No. PCT/US2011/054425 dated Sep. 4, 2012 (6 pages).

Budagavi et al., "Core Transform Design in the High Efficiency Video Coding (HEVC) Standard," IEEE Journal of Selected Topics in Signal Processing, vol. 7 (6), Dec. 2013, 13 pp.

Meher et al., "Efficient Integer DCT Architectures for HEVC," IEEE Transactions on Circuits and Systems for Video Technology, 2013, 11 pp.

* cited by examiner

ENTROPY CODING COEFFICIENTS USING A JOINT CONTEXT MODEL

This application claims the benefit of U.S. Provisional Application No. 61/389,170, filed Oct. 1, 2010, which is incorporated herein by reference in its entirety.

TECHNICAL FIELD

This disclosure relates to video coding and, more particularly, entropy coding for video coding.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), or the emerging High Efficiency Video Coding (HEVC) standard, and extensions of such standards.

Video compression techniques perform spatial prediction and/or temporal prediction to reduce or remove redundancy inherent in video sequences. For block-based video coding, a video frame or slice may be partitioned into video blocks or coding units (CUs). CUs may be further partitioned into one or more prediction units (PUs) to determine predictive video data for the CU. The video compression techniques may also partition the CUs into one or more transform units (TUs) of residual video block data, which represents the difference between the video block to be coded and the predictive video data. Linear transforms, such as a two-dimensional discrete cosine transform (DCT), may be applied to a TU to transform the residual video block data from the pixel domain to the frequency domain to achieve further compression.

Following the transforms, transform coefficients within the TU may be further compressed via quantization. Following quantization, an entropy coding unit may apply a zig-zag scan or another scan order associated with a size of the TU to scan the two-dimensional array of coefficients in the TU to produce a serialized vector that can be entropy encoded. The entropy coding unit then entropy codes the serialized vector of coefficients. For example, the entropy coding unit may perform context adaptive variable length coding (CAVLC), context adaptive binary arithmetic coding (CABAC), or another entropy coding technique. In the case of context adaptive entropy coding, the entropy coding unit may select contexts for each of the coefficients within the TU according to a context model associated with the size of the TU. The coefficients may then be entropy encoded based on the selected contexts.

SUMMARY

In general, this disclosure describes techniques for performing entropy encoding and decoding of transform coefficients associated with a block of residual video data using a joint context model shared between transform units having different sizes. For example, the joint context model may be shared between transform units having a first size of 32×32 and transform units having a second size of 16×16. In some cases, more than two sizes of transform units may share the same joint context model. As one example, the joint context model may be a joint context model of the significance map for the transform unit. In other examples, the joint context model may be associated with other coding information or syntax elements.

In the emerging High Efficiency Video Coding (HEVC) standard, a coding unit (CU) may include one or more transform units (TUs) that include residual video data for transform. Additional transform unit sizes, e.g., 32×32 up to 128× 128, have been proposed to improve video coding efficiency, but also result in increased memory and computational requirements to maintain context models for each of the additional transform unit sizes. Performing entropy coding using a joint context model shared between transform units having different sizes may reduce an amount of memory necessary to store contexts and probabilities on video encoding and decoding devices, and reduce computational costs of maintaining context models on video encoding and decoding devices.

In some examples, the techniques may also reduce intermediate buffering requirements for larger transform unit sizes when performing two-dimensional transforms. In that case the techniques include zeroing out, i.e., setting values to zero, of a higher frequency subset of transform coefficients included in a transform unit of a first size after applying each direction of a two-dimensional transform to generate a retained coefficient block. In this example, the joint context model for entropy coding may be shared between a transform unit having the first size with coefficients zeroed out to generate the retained coefficient block and a transform unit originally having the second size. In some cases, the retained coefficient block may have a size equal to the second size. In other examples, the joint context model for entropy coding may be shared between a transform unit having the first size and a transform unit having the second size.

In one example, the disclosure describes a method of decoding video data comprising maintaining a joint context model shared by a transform unit having a first size with coefficients that are zeroed out to generate a retained coefficient block and a transform unit having the second size, wherein the first size and the second size are different. The method also includes selecting contexts for coefficients associated with the transform unit having one of the first size with the retained coefficient block and the second size according to the joint context model, and entropy coding the coefficients associated with the transform unit according to a coding process based on the selected contexts.

In another example, the disclosure describes a video coding device comprising a memory that stores a joint context model shared by a transform unit having a first size with coefficients that are zeroed out to generate a retained coefficient block and a transform unit having the second size, wherein the first size and the second size are different. The video coding device further includes a processor configured to maintain the joint context model, select contexts for coefficients associated with the transform unit having one of the first size with the retained coefficient block and the second size according to the joint context model, and entropy code the coefficients associated with the transform unit according to a coding process based on the selected contexts.

In a further example, the disclosure describes a video coding device comprising means for maintaining a joint context model shared by a transform unit having a first size with coefficients that are zeroed out to generate a retained coefficient block and a transform unit having the second size, wherein the first size and the second size are different. The video coding device also comprises means for selecting contexts for coefficients associated with the transform unit having one of the first size with the retained coefficient block and the second size according to the joint context model, and means for entropy coding the coefficients associated with the transform unit according to a coding process based on the selected contexts.

In another example, the disclosure describes a computer-readable medium comprising instructions for coding video data that, when executed, cause a processor to maintain a joint context model shared by a transform unit having a first size with coefficients that are zeroed out to generate a retained coefficient block and a transform unit having the second size, wherein the first size and the second size are different. The instructions also cause the processor to select contexts for coefficients associated with the transform unit having one of the first size with the retained coefficient block and the second size according to the joint context model, and entropy code the coefficients associated with the transform unit according to a coding process based on the selected contexts.

In another example, the disclosure describes a method of coding video data comprising maintaining a joint context model shared by a transform unit having a first size and a transform unit having a second size, wherein the first size and the second size are different. The method also includes selecting contexts for coefficients associated with the transform unit having one of the first size and the second size according to the joint context model, and entropy coding the coefficients of the transform unit according to a coding process based on the selected contexts.

In an additional example, the disclosure describes a video coding device comprising a memory that stores a joint context model shared by a transform unit having a first size and a transform unit having a second size, wherein the first size and the second size are different, and a processor configured to maintain the joint context model, select contexts for coefficients associated with the transform unit having one of the first size and the second size according to the joint context model, and entropy code the coefficients of the transform unit according to a coding process based on the selected contexts.

In a further example, the disclosure describes a video coding device comprising means for maintaining a joint context model shared by a transform unit having a first size and a transform unit having a second size, wherein the first size and the second size are different. The video coding device also includes means for selecting contexts for coefficients associated with the transform unit having one of the first size and the second size according to the joint context model, and means for entropy coding the coefficients of the transform unit according to a coding process based on the selected contexts.

In another example, the disclosure describes a computer-readable medium comprising instructions for coding video data that, when executed, cause a processor to maintain a joint context model shared by a transform unit having a first size and a transform unit having a second size, wherein the first size and the second size are different, select contexts for coefficients associated with the transform unit having one of the first size and the second size according to the joint context model, and entropy code the coefficients of the transform unit according to a coding process based on the selected contexts.

The details of one or more examples are set forth in the accompanying drawings and the description below. Other features, objects, and advantages will be apparent from the description and drawings, and from the claims.

DETAILED DESCRIPTION

Figure 1:
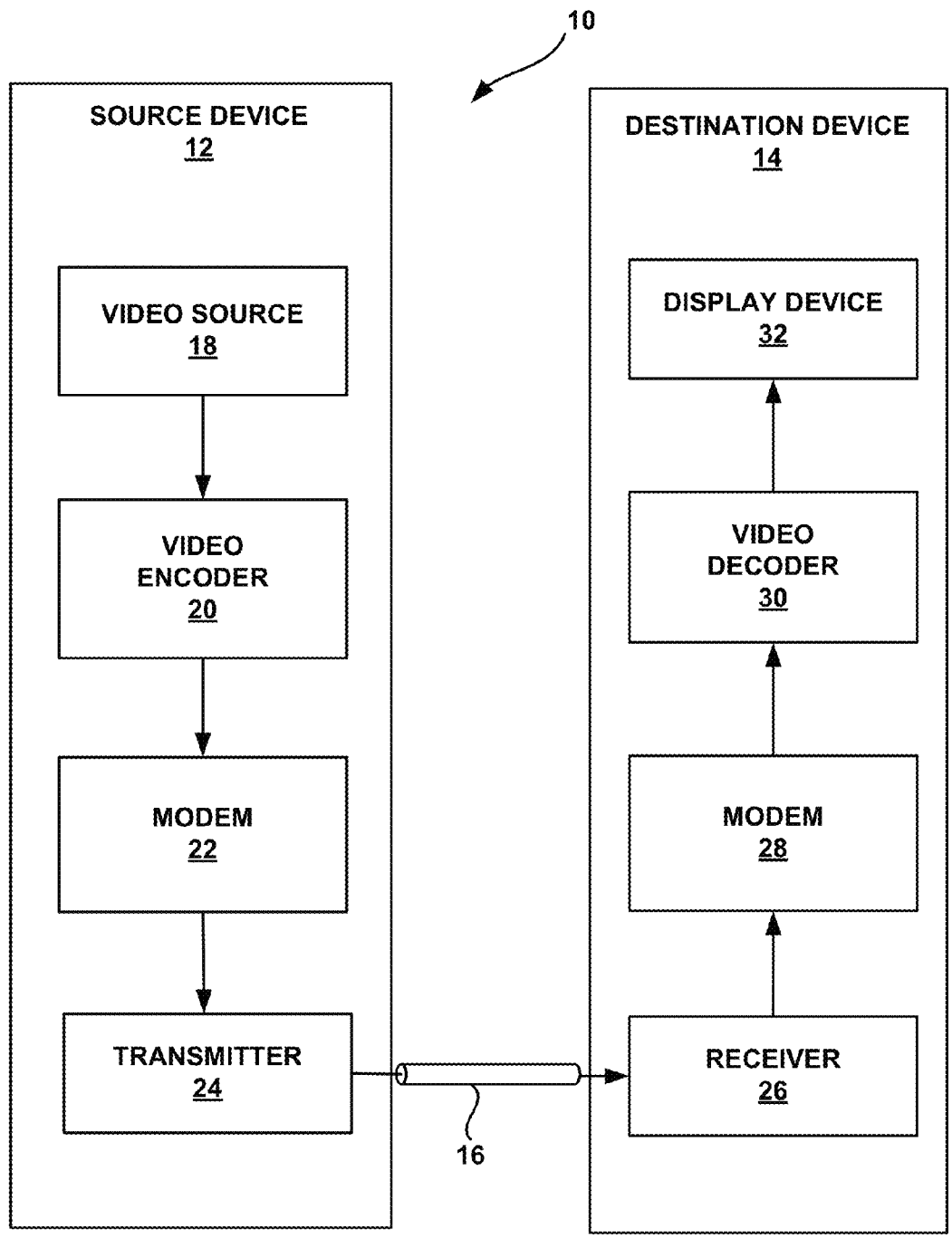
FIG. 1 is a block diagram illustrating an example video encoding and decoding system that may utilize techniques for performing entropy coding of video coefficients using a joint context model shared between transform units having different sizes.

In general, this disclosure describes techniques for performing entropy encoding and decoding of transform coefficients associated with a block of residual video data using a joint context model shared between transform units having different sizes. For example, the joint context model may be shared between transform units having a first size of 32×32 and transform units having a second size of 16×16. In the emerging High Efficiency Video Coding (HEVC) standard, a coding unit (CU) may include one or more transform units (TUs) that include residual video data. Before transform, the residual video data includes residual pixel values in the spatial domain. After transform, the residual video data includes residual transform coefficients in a transform domain. Additional transform unit sizes, e.g., 32×32 up to 128×128, have been proposed to improve video coding efficiency, but also result in increased memory and computational requirements to maintain context models for each of the additional transform unit sizes. Performing entropy coding using joint context model shared between transform units having different sizes may reduce an amount of memory necessary to store contexts and probabilities on video encoding and decoding devices, and reduce computational costs of maintaining context models on video encoding and decoding devices.

In some examples, the techniques may also reduce intermediate buffering requirements for larger transform unit sizes when performing two-dimensional transforms. The techniques include zeroing out, i.e., setting values to zero, of a higher frequency subset of transform coefficients included in a transform unit of a first size after each direction of a two-dimensional transform has been applied to generate a retained coefficient block. The video encoding and decoding devices may then buffer a reduced number of coefficients between applying each direction, i.e., rows and columns, of the two-dimensional transform. When the higher frequency coefficients are zeroed out of the transform unit having the first size, the coefficients included in the retained coefficient block have similar probability statistics as coefficients included in a transform unit originally of the second size. In this case, the joint context model for entropy coding may be shared between transform units having the first size with coefficients zeroed out to generate the retained coefficient block and transform units originally having the second size. In some cases, the retained coefficient block may have a size equal to the second size. In other cases, the retained coefficient block may have a size equal to a third size, different than both the first size and the second size.

In other examples, coefficients included in a first transform unit having a first size may have similar probability statistics as coefficients included in a second transform unit of a second size even without zeroing out the higher frequency coefficients within the first transform unit. This is possible because the higher frequency coefficients may represent so little residual video data that the effect on the probability statistics of neighboring coefficients for entropy coding is negligible. In this case, the joint context model for entropy coding may be shared between transform units having the first size and transform units having the second size.

FIG. 1 is a block diagram illustrating an example video encoding and decoding system that may utilize techniques for performing entropy coding of video coefficients using a joint context model shared between transform units having different sizes. As shown in FIG. 1, system 10 includes a source device 12 that may store encoded video and/or transmit encoded video to a destination device 14 via a communication channel 16. Source device 12 and destination device 14 may not necessarily participate in real-time active communication with one another. In some cases, source device 12 may store the encoded video data to a storage medium that destination device 14 may access as desired via disk access or may store the encoded video data to a file server that destination device 14 may access as desired via streaming. Source device 12 and destination device 14 may comprise any of a wide range of devices. In some cases, source device 12 and destination device 14 may comprise wireless communication devices that can communicate video information over a communication channel 16, in which case communication channel 16 is wireless.

The techniques of this disclosure, however, which concern entropy coding of video coefficients using a joint context model, are not necessarily limited to wireless applications or settings. For example, these techniques may apply to over-the-air television broadcasts, cable television transmissions, satellite television transmissions, Internet video transmissions, encoded digital video that is encoded onto a storage medium, or other scenarios. Accordingly, communication channel 16 may comprise any combination of wireless or wired media suitable for transmission of encoded video data, and devices 12, 14 may comprise any of a variety of wired or wireless media devices such as mobile telephones, smart-phones, digital media players, set-top boxes, televisions, displays, desktop computers, portable computers, tablet computers, gaming consoles, portable gaming devices, or the like.

In the example of FIG. 1, source device 12 includes a video source 18, a video encoder 20, a modulator/demodulator (modem) 22 and a transmitter 24. Destination device 14 includes a receiver 26, a modem 28, a video decoder 30, and a display device 32. In other examples, a source device and a destination device may include other components or arrangements. For example, source device 12 may receive video data from an external video source 18, such as an external camera, a video storage archive, a computer graphics source, or the like. Likewise, destination device 14 may interface with an external display device, rather than including an integrated display device.

The illustrated system 10 of FIG. 1 is merely one example. In other examples, any digital video encoding and/or decoding device may perform the disclosed techniques for entropy coding of video coefficients using a joint context model. The techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be modulated by modem 22 according to a communication standard, and transmitted to destination device 14 via transmitter 24. Modem 22 may include various mixers, filters, amplifiers or other components designed for signal modulation. Transmitter 24 may include circuits designed for transmitting data, including amplifiers, filters, and one or more antennas.

In accordance with this disclosure, video encoder 20 of source device 12 may be configured to apply the techniques for entropy encoding video coefficients using a joint context model. A coding unit (CU) of a video frame to be encoded may include one or more transform units (TUs) that include residual video data. Before transform, the residual video data includes residual pixel values in the spatial domain. After transform, the residual video data includes residual transform coefficients in a transform domain. Video encoder 20 may maintain a joint context model shared between transform units having different sizes, and select contexts for coefficients associated with one of the transform units according to the joint context model. Video encoder 20 may then entropy encode the coefficients based on the selected contexts.

As an example, the joint context model may be shared between transform units having a first size of 32×32 and transform units having a second size of 16×16. In other examples, more than two sizes of transform units may share the same joint context model. In addition, the two or more sizes of transform units may share some or all of the context models for the TUs. In one case, the joint context model may be the joint context model of a significance map for the TU. In other cases, the joint context model may be associated with other coding information or syntax elements. The techniques, therefore, may reduce an amount of memory necessary to store contexts and probabilities on video encoder 20, and reduce computational costs of maintaining context models on video encoder 20.

In one example, video encoder 20 may zero out, i.e., set values equal to zero, a higher frequency subset of transform coefficients included in a transform unit of a first size after each direction of a two-dimensional transform is applied to generate a retained coefficient block. In this case, the techniques may reduce a number of coefficients to be buffered between applying each direction, i.e., rows and columns, of the two-dimensional transform. When the high frequency coefficients are zeroed out of the transform unit, the coefficients included in the retained coefficient block have similar probability statistics as coefficients included in a transform unit originally of the second size. In this example, video encoder 20 may maintain a joint context model shared by transform units having the first size with coefficients that are zeroed out to generate the retained coefficient block and transform units having the second size, and select contexts for the coefficients of a transform unit of one of the first size with the retained coefficient block and the second size according to the joint context model. In some cases, the retained coefficient block may have a size equal to the second size. In other cases, the retained coefficient block may have a size equal to a third size, different than both the first size and the second size.

In another example, coefficients included in a first transform unit having a first size may have similar probability statistics as coefficients included in a second transform unit having a second size even without zeroing out the high frequency coefficients within the first transform unit. This is possible because the high frequency coefficients may represent so little residual video data that the effect on the probability statistics of neighboring coefficients for entropy coding is negligible. In this example, video encoder 20 may maintain a joint context model shared by transform units having the first size and the second size, and select contexts for the coefficients within a transform unit of one of the first and second size according to the joint context model. In some cases, only the high frequency coefficients within the transform units of the first size and the second size may share the joint context model. The low frequency coefficients, e.g., the DC components and neighboring coefficients, within the transform of the first size may use a different context model than the low frequency coefficients within the transform of the second size.

Receiver 26 of destination device 14 receives information over channel 16, and modem 28 demodulates the information. The information communicated over channel 16 may include syntax information defined by video encoder 20, which is also used by video decoder 30, that includes syntax elements that describe characteristics and/or processing of coding units (CUs), prediction units (PUs), transform units (TUs) or other units of coded video, e.g., video slices, video frames, and video sequences or groups of pictures (GOPs). Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

In accordance with this disclosure, video decoder 30 of destination device 14 may be configured to apply the techniques for entropy decoding video coefficients using a joint context model. A CU of a video frame to be decoded may include one or more TUs that include residual video data before and after transform. Video decoder 30 may maintain a joint context model shared between transform units having different sizes, and select contexts for coefficients associated with one of the transform units according to the joint context model. Video decoder 30 may then entropy decode the coefficients based on the selected contexts.

As an example, the joint context model may be shared between transform units having a first size of 32×32 and transform units having a second size of 16×16. As described above, in other examples, more than two sizes of transform units may share the same joint context model. In addition, the two or more sizes of transform units may share some or all of the context models for the TUs. In one case, the joint context model may be the joint context model of a significance map for the TU. In other cases, the joint context model may be associated with other coding information or syntax elements. The techniques, therefore, may reduce an amount of memory necessary to store contexts and probabilities on video decoder 30, and reduce computational costs of maintaining context models on video decoder 30.

In one example, video decoder 30 may receive a bitstream that represents encoded coefficients associated with a retained coefficient block and zeroed out coefficients from a transform unit having a first size. When the high frequency coefficients are zeroed out of the transform unit, the coefficients included in the retained coefficient block have similar probability statistics as coefficients included in a transform unit originally of the second size. In this example, video decoder 30 may maintain a joint context model shared by transform units having the first size with coefficients that are zeroed out to generate the retained coefficient block and transform units having the second size, and select contexts for the encoded coefficients associated with a transform unit of one of the first size with the retained coefficient block and the second size according to the joint context model. In some cases, the retained coefficient block may have a size equal to the second size. In other cases, the retained coefficient block may have a size equal to a third size, different than both the first size and the second size.

In another example, video decoder 30 may receive a bitstream that represents encoded coefficients associated with a transform unit having one of a first size and a second size. Coefficients included in a first transform unit having the first size may have similar probability statistics as coefficients included in a second transform unit of the second size even without zeroing out the high frequency coefficients within the first transform unit. In this example, video decoder 30 may maintain a joint context model shared by transform units having the first size and the second size, and select contexts for the encoded coefficients associated with a transform unit of one of the first and second size according to the joint context model. In some cases, only the high frequency coefficients within the transform units of the first size and the second size may share the joint context model. The low frequency coefficients, e.g., the DC components and neighboring coefficients, within the transform of the first size may use a different context model than the low frequency coefficients within the transform of the second size.

In the example of FIG. 1, communication channel 16 may comprise any wireless or wired communication medium, such as a radio frequency (RF) spectrum or one or more physical transmission lines, or any combination of wireless and wired media. Communication channel 16 may form part of a packet-based network, such as a local area network, a wide-area network, or a global network such as the Internet. Communication channel 16 generally represents any suitable communication medium, or collection of different communication media, for transmitting video data from source device 12 to destination device 14, including any suitable combination of wired or wireless media. Communication channel 16 may include routers, switches, base stations, or any other equipment that may be useful to facilitate communication from source device 12 to destination device 14. As described above, in some cases, source device 12 and destination device 14 may not participate in real-time active communication via communication channel 16. For example, source device 12 may instead store the encoded video data to a storage medium that destination device 14 may access as desired via disk access or store the encoded video data to a file server that destination device 14 may access as desired via streaming.

Video encoder 20 and video decoder 30 may operate according to a video compression standard, such as the emerging High Efficiency Video Coding (HEVC) standard or the ITU-T H.264 standard, alternatively referred to as MPEG-4, Part 10, Advanced Video Coding (AVC). The techniques of this disclosure, however, are not limited to any particular coding standard. Other examples include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The HEVC standardization efforts are based on a model of a video coding device referred to as the HEVC Test Model (HM). The HM presumes several additional capabilities of video coding devices relative to existing devices according to, e.g., ITU-T H.264/AVC. The HM refers to a block of video data as a coding unit (CU). Syntax data within a bitstream may define a largest coding unit (LCU), which is a largest coding unit in terms of the number of pixels. In general, a CU has a similar purpose to a macroblock of the H.264 standard, except that a CU does not have a size distinction. Thus, a CU may be split into sub-CUs. In general, references in this disclosure to a CU may refer to a largest coding unit of a picture or a sub-CU of an LCU. An LCU may be split into sub-CUs, and each sub-CU may be further split into sub-CUs. Syntax data for a bitstream may define a maximum number of times an LCU may be split, referred to as CU depth. Accordingly, a bitstream may also define a smallest coding unit (SCU).

A CU that is not further split (i.e., a leaf node of an LCU) may include one or more prediction units (PUs). In general, a PU represents all or a portion of the corresponding CU, and includes data for retrieving a reference sample for the PU. For example, when the PU is intra-mode encoded, the PU may include data describing an intra-prediction mode for the PU. As another example, when the PU is inter-mode encoded, the PU may include data defining a motion vector for the PU. The data defining the motion vector may describe, for example, a horizontal component of the motion vector, a vertical component of the motion vector, a resolution for the motion vector (e.g., one-half pixel precision, one-quarter pixel precision, or one-eighth pixel precision), a reference frame to which the motion vector points, and/or a reference frame list (e.g., List 0 or List 1) for the motion vector. Data for the CU defining the PU(s) may also describe, for example, partitioning of the CU into one or more PUs. Partitioning modes may differ between whether the CU is skip or direct mode encoded, intra-prediction mode encoded, or inter-prediction mode encoded.

A CU having one or more PUs may also include one or more transform units (TUs). Following prediction using a PU, a video encoder may calculate residual values for the portion of the CU corresponding to the PU. The residual values included in the TUs correspond to pixel difference values that may be transformed into transform coefficients, then quantized, and scanned to produce serialized transform coefficients for entropy coding. A TU is not necessarily limited to the size of a PU. Thus, TUs may be larger or smaller than corresponding PUs for the same CU. In some examples, the maximum size of a TU may be the size of the corresponding CU. This disclosure uses the term "video block" to refer to any of a CU, PU, or TU.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. Each of video encoder 20 and video decoder 30 may be included in one or more encoders or decoders, either of which may be integrated as part of a combined encoder/decoder (CODEC) in a respective camera, computer, mobile device, subscriber device, broadcast device, set-top box, server, or the like.

A video sequence or group of pictures (GOP) typically includes a series of video frames. A GOP may include syntax data in a header of the GOP, a header of one or more frames of the GOP, or elsewhere, that describes a number of frames included in the GOP. Each frame may include frame syntax data that describes an encoding mode for the respective frame. Video encoder 20 typically operates on video blocks within individual video frames in order to encode the video data. A video block may correspond to a CU or a PU of the CU. The video blocks may have fixed or varying sizes, and may differ in size according to a specified coding standard. Each video frame may include a plurality of slices. Each slice may include a plurality of CUs, which may include one or more PUs.

As an example, the HEVC Test Model (HM) supports prediction in various CU sizes. The size of an LCU may be defined by syntax information. Assuming that the size of a particular CU is 2N×2N, the HM supports intra-prediction in sizes of 2N×2N or N×N, and inter-prediction in symmetric sizes of 2N×2N, 2N×N, N×2N, or N×N. The HM also supports asymmetric splitting for inter-prediction of 2N×nU, 2N×nD, nL×2N, and nR×2N. In asymmetric splitting, one direction of a CU is not split, while the other direction is split into 25% and 75%. The portion of the CU corresponding to the 25% split is indicated by an "n" followed by an indication of "Up", "Down," "Left," or "Right." Thus, for example, "2N×nU" refers to a 2N×2N CU that is split horizontally with a 2N×0.5N PU on top and a 2N×1.5N PU on bottom.

In this disclosure, "N×N" and "N by N" may be used interchangeably to refer to the pixel dimensions of a video block (e.g., CU, PU, or TU) in terms of vertical and horizontal dimensions, e.g., 16×16 pixels or 16 by 16 pixels. A 16×16 block will have 16 pixels in a vertical direction (y=16) and 16 pixels in a horizontal direction (x=16). Likewise, an N×N block has N pixels in a vertical direction and N pixels in a horizontal direction, where N represents a nonnegative integer value. The pixels in a block may be arranged in rows and columns. Moreover, blocks need not necessarily have the same number of pixels in the horizontal direction as in the vertical direction. For example, blocks may comprise rectangular areas with N×M pixels, where M is not necessarily equal to N.

Following intra-predictive or inter-predictive coding to produce a PU for a CU, video encoder 20 may calculate residual data to produce one or more TUs for the CU. The residual data may correspond to pixel differences between pixels of the unencoded picture and prediction values of a PU of a CU. Video encoder 20 may form one or more TUs including the residual data for the CU. Video encoder 20 may then transform the TUs. Prior to application of a transform, such as a discrete cosine transform (DCT), an integer transform, a wavelet transform, or a conceptually similar transform, TUs of a CU may comprise residual video data comprising pixel difference values in the pixel domain. Following application of the transform, the TUs may comprise transform coefficients that represent the residual video data in the frequency domain.

Following any transforms to produce transform coefficients, quantization of transform coefficients may be performed. Quantization generally refers to a process in which transform coefficients are quantized to possibly reduce the amount of data used to represent the coefficients. The quantization process may reduce the bit depth associated with some or all of the coefficients. For example, an n-bit value may be rounded down to an m-bit value during quantization, where n is greater than m.

Video encoder 20 may apply a zig-zag scan, a horizontal scan, a vertical scan, or another scan order associated with a size of the TU to scan the quantized transform coefficients to produce a serialized vector that can be entropy encoded. In some examples, video encoder 20 may utilize a predefined scan order to scan the quantized transform coefficients. In other examples, video encoder 20 may perform an adaptive scan. After scanning the quantized transform coefficients to form a one-dimensional vector, video encoder 20 may entropy encode the one-dimensional vector, e.g., according to context adaptive variable length coding (CAVLC), context adaptive binary arithmetic coding (CABAC), or another entropy encoding methodology.

To perform context adaptive entropy coding, video encoder 20 must assign a context to each coefficient according to a context model, which may relate to, for example, whether the values of the neighboring coefficients are non-zero. Video encoder 20 then determines a coding process for the coefficient associated with the assigned context in the context model. Conventionally, video encoder 20 must maintain separate context models for each of the different sizes of TUs supported by the implemented video compression standard. For the HEVC standard, additional transform unit sizes, e.g., 32×32 up to 128×128, have been proposed to improve video coding efficiency, but the additional TU sizes also result in increased memory and computational requirements to maintain the context models for each of the additional transform unit sizes.

In accordance with the techniques of this disclosure, to perform context adaptive entropy coding, video encoder 20 may select contexts for the coefficients according to a joint context model shared between TUs of different sizes. More specifically, video encoder 20 may assign a context in the joint context model to a given coefficient of a TU based on values of previously encoded neighboring coefficients of the TU. The assigned context is selected based on criteria defined by the joint context model shared by the TU. Video encoder 20 may determine a coding process for the coefficient associated with the assigned context in the joint context model. Video encoder 20 then entropy encodes the coefficient based on the determined probability estimate. For example, in the case of CABAC, video encoder 20 may determine a probability estimate for a value (e.g., 0 or 1) of the coefficient associated with the assigned context in the joint context model. Video encoder 20 then updates the probability estimate associated with the assigned context in the joint context model based on the actual coded value of the coefficient.

As an example, video encoder 20 may select contexts using the same joint context model for coefficients associated with either a retained coefficient block within a first transform unit originally having a first size, or a second transform unit originally having the second size. In addition, video encoder 20 may update probability estimates associated with the selected contexts in the joint context model based on actual coded values of the coefficients of either the retained coefficient block within the first transform unit originally of the first size, or the second transform unit originally of the second size. As another example, video encoder 20 may select contexts using the same joint context model for coefficients associated with either a first transform unit having a first size or a second transform unit having a second size. In this case, video encoder 20 may then update probability estimates associated with the selected contexts in the joint context model based on actual coded values of the coefficients of either the first transform unit of the first size or the second transform unit of the second size.

In either case, sharing the joint context model between two or more sizes of transform units may reduce an amount of memory necessary to store contexts and probabilities on video encoder 20. In addition, sharing a joint context model may also reduce computational costs of maintaining context models on video encoder 20, including resetting all the context models at the beginning of a video slice.

Video encoder 20 may also entropy encode syntax elements indicating prediction information. For example, video encoder 20 may entropy encode syntax elements indicating video block information including sizes of CUs, PUs, and TUs, motion vector information for intra-mode prediction, and significant coefficient map information, i.e., a map of ones and zeros indicating position of significant coefficients, for CABAC. Video decoder 30 may operate in a manner essentially symmetrical to that of video encoder 20.

Figure 2:
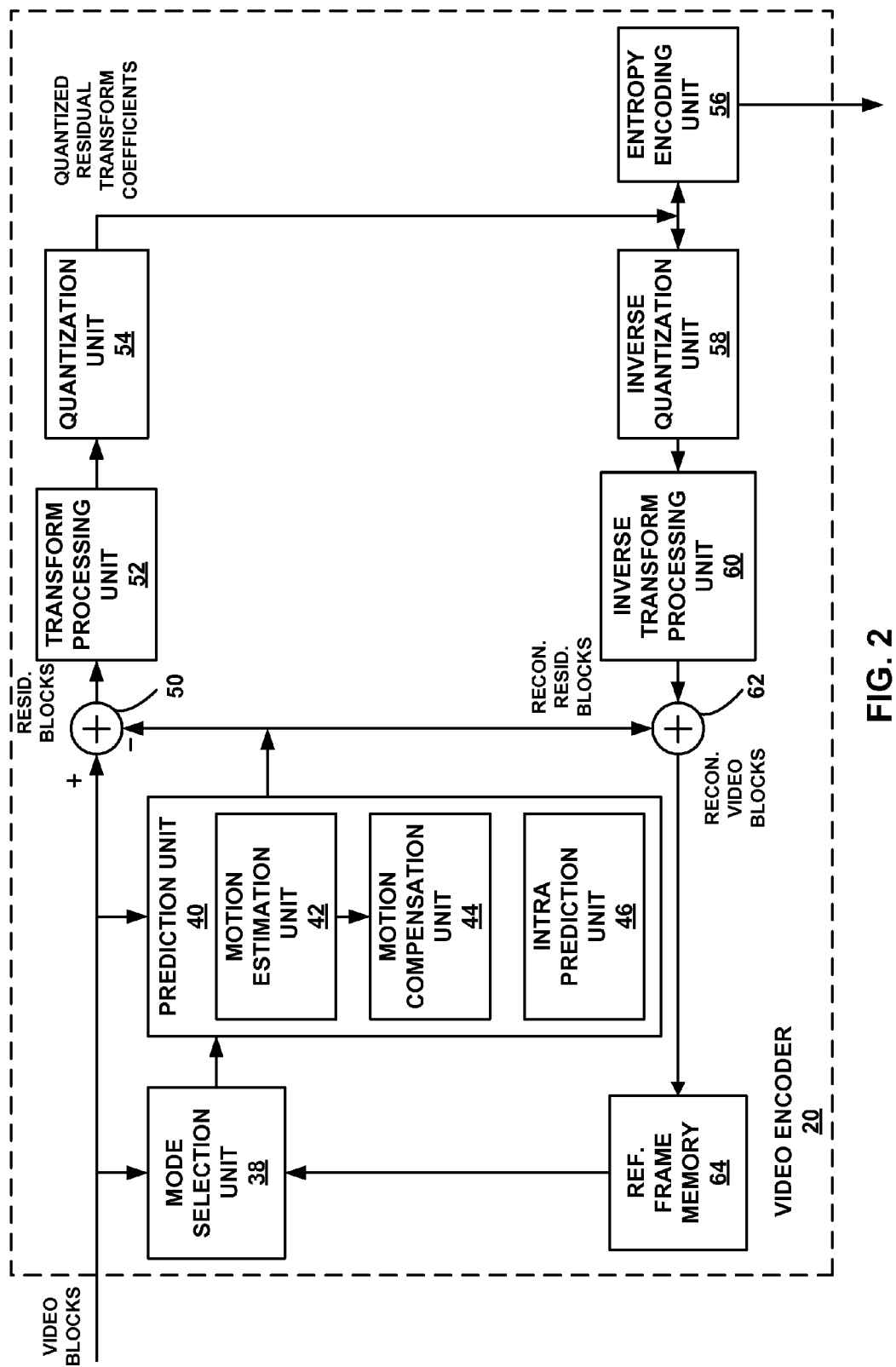
FIG. 2 is a block diagram illustrating an example video encoder that may implement techniques for entropy encoding video coefficients using a joint context model.

FIG. 2 is a block diagram illustrating an example video encoder that may implement techniques for entropy encoding video coefficients using a joint context model. Video encoder 20 may perform intra- and inter-coding of coding units within video frames. Intra-coding relies on spatial prediction to reduce or remove spatial redundancy in video within a given video frame. Inter-coding relies on temporal prediction to reduce or remove temporal redundancy in video within adjacent frames of a video sequence. Intra-mode (I mode) may refer to any of several spatial based compression modes. Inter-modes such as unidirectional prediction (P mode), bidirectional prediction (B mode), or generalized P/B prediction (GPB mode) may refer to any of several temporal-based compression modes.

In the example of FIG. 2, video encoder 20 includes mode selection unit 38, prediction unit 40, summation unit 50, transform processing unit 52, quantization unit 54, entropy encoding unit 56, and reference frame memory 64. Prediction unit 40 includes motion estimation unit 42, motion compensation unit 44, and intra prediction unit 46. For video block reconstruction, video encoder 20 also includes inverse quantization unit 58, inverse transform processing unit 60, and summation unit 62. A deblocking filter or other in-loop filters such an adaptive loop filter(ALF) and a sample adaptive offset (SAO) (not shown in FIG. 2) may also be included to filter block boundaries to remove blockiness artifacts from reconstructed video. If desired, the deblocking filter would typically filter the output of summation unit 62.

As shown in FIG. 2, video encoder 20 receives a video block within a video frame or slice to be encoded. The frame or slice may be divided into multiple video blocks or CUs. Mode selection unit 38 may select one of the coding modes, intra or inter, for the video block based on error results. Prediction unit 40 then provides the resulting intra- or inter-coded predictive block to summation unit 50 to generate residual block data, and to summation unit 62 to reconstruct the encoded block for use as a reference block in a reference frame.

Intra prediction unit 46 within prediction unit 40 performs intra-predictive coding of the video block relative to one or more neighboring blocks in the same frame as the video block to be coded. Motion estimation unit 42 and motion compensation unit 44 within prediction unit 40 perform inter-predictive coding of the video block with respect to one or more reference blocks in one or more reference frames stored in reference frame memory 64. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a video block or PU within a current video frame relative to a reference block or PU within a reference frame. A reference block is a block that is found to closely match the video block or PU to be coded in terms of pixel difference, which may be determined by sum of absolute difference (SAD), sum of square difference (SSD), or other difference metrics.

Motion estimation unit 42 sends the calculated motion vector to motion compensation unit 44. Motion compensation, performed by motion compensation unit 44, may involve fetching or generating the predictive block based on the motion vector determined by motion estimation. Video encoder 20 forms a residual video block by subtracting the predictive block from the video block being coded. Summation unit 50 represents the component or components that perform this subtraction operation.

Motion compensation unit 44 may generate syntax elements defined to represent prediction information at one or more of a video sequence level, a video frame level, a video slice level, a video CU level, or a video PU level. For example, motion compensation unit 44 may generate syntax elements indicating video block information including sizes of CUs, PUs, and TUs, and motion vector information for intra-mode prediction.

After video encoder 20 forms the residual video block by subtracting the predictive block from the current video block, transform processing unit 52 may form one or more TUs from the residual block. Transform processing unit 52 applies a transform, such as a discrete cosine transform (DCT), an integer transform, a wavelet transform, or a conceptually similar transform, to the TU to produce a video block comprising residual transform coefficients. The transform may convert the residual block from a pixel domain to a transform domain, such as a frequency domain. More specifically, prior to application of the transform, the TU may comprise residual video data in the pixel domain, and, following application of the transform, the TU may comprise transform coefficients that represent the residual video data in the frequency domain.

In some examples, transform processing unit 52 may comprise a two-dimensional separable transform. Transform processing unit 52 may apply the two-dimensional transform to the TU by first applying a one-dimensional transform to the rows of residual video data within the TU, i.e., in a first direction, and then applying a one-dimensional transform to the columns of residual video data within the TU, i.e., in a second direction, or vice versa. As one example, the TU may comprise a 32×32 TU. Transform processing unit 52 may first apply a 32-point one-dimensional transform to each row of the pixel data in the TU to generate a 32×32 TU of intermediate transform coefficients, and second apply a 32-point one-dimensional transform to each column of the intermediate transform coefficients in the TU to generate a 32×32 TU of transform coefficients.

After application of the one-dimensional transform in the first direction to the residual video data in the TU, video encoder 20 buffers the intermediate transform coefficients for application of the one-dimensional transform in the second direction. As described above, in the HEVC standard, larger transform unit sizes, e.g., 32×32 up to 128×128, have been proposed to improve video coding efficiency. The larger TU sizes, however, will also result in increased intermediate buffering requirements for two-dimensional transforms. For example, in the case of a 32×32 TU, video encoder 20 would have to buffer 1024 intermediate transform coefficients after the one-dimensional transform in the first direction.

In order to reduce the intermediate buffering requirements for larger TU sizes, the techniques described in this disclosure include zeroing out a high frequency subset of transform coefficients included in a TU of a first size after each direction of a two-dimensional transform has been applied. In this way, transform processing unit 52 may generate a retained coefficient block within the TU that has a second size smaller than the first size of the TU.

The process of zeroing out comprises setting values of a subset of transform coefficients within the TU equal to zero. The transform coefficients that are zeroed out are not computed or discarded; instead, the zeroed-out transform coefficients are simply set equal to zero and have no value to store or encode. According to this disclosure, the zeroed-out transform coefficients are typically the higher frequency transform coefficients relative to the retained, lower frequency transform coefficients in the TU. High frequency transform coefficients represent residual video data that ordinarily corresponds to very small pixel differences between the video block to be encoded and the predictive block. The high frequency transform coefficients, therefore, may contain so little residual video data that setting the values equal to zero has a negligible effect on decoded video quality.

As an example, transform processing unit 52 may apply a one-dimensional transform in a first direction, e.g., row-wise, to the residual video data in a 32×32 TU and zero-out half of the intermediate transform coefficients output from the transform. Video encoder 20 then only needs to buffer the retained half of the intermediate transform coefficients. Transform processing unit 52 may then apply the one-dimensional transform in a second direction, e.g., column-wise, to the retained intermediate transform coefficients in the 32×32 TU and again zero-out half of the retained transform coefficients output from the transform. In this way, transform processing unit 52 may generate a retained coefficient block of significant coefficients having size 16×16 within the TU originally of size 32×32.

In the example described above, transform processing unit 52 was configured to generate a 16×16 retained coefficient block, i.e., one-quarter of the original size of the TU. In other cases, transform processing unit 52 may be configured to generate a retained coefficient block having a different size by zeroing out a larger or smaller percentage of the coefficients depending on coding complexity requirements for the coding process. Moreover, in some cases, transform processing unit 52 may be configured to generate a retained coefficient block having a rectangular area. In this case, the techniques provide further reduction in intermediate buffering requirements by first applying the one-dimensional transform in the direction of the shorter side (i.e., fewer retained transform coefficients) of the rectangular area. In this way, video encoder 20 may buffer less than half of the intermediate transform coefficients before application of the one-dimensional transform in the direction of the longer side of the rectangular area. The zeroing out processes for both square and rectangular area retained coefficients blocks is described in more detail with respect to FIGS. 3A and 3B.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. Entropy encoding unit 56 or quantization unit 54 may then perform a scan of the TU including the quantized transform coefficients. Entropy encoding unit 56 may apply a zig-zag scan or another scan order associated with a size of the TU to scan the quantized transform coefficients to produce a serialized vector that can be entropy encoded.

In one example, in which coefficients of a TU originally of a first size have been zeroed out to generate a retained coefficient block having a second size, entropy encoding unit 56 may scan the retained coefficients using a scan order for a TU of the second size. In this case, entropy encoding unit 56 may apply a 16×16 scan order to a retained coefficient block having size 16×16 within a TU originally of size 32×32. In another example, in which coefficients of a TU originally of a first size have been zeroed out to generate a retained coefficient block having a second size, entropy encoding unit 56 may scan the retained coefficients using a scan order for a TU of the first size that has been modified to skip coefficients of the TU not included in the retained coefficient block. In this case, entropy encoding unit may apply a 32×32 scan order to a retained coefficient block having size 16×16 by skipping all the zeroed out coefficients within a TU originally of size 32×32.

After scanning the quantized transform coefficients to form a one-dimensional vector, entropy encoding unit 56 entropy codes the vector of quantized transform coefficients. For example, entropy encoding unit 56 may perform context adaptive entropy coding, such as CABAC, CAVLC, or another entropy coding technique. Following the entropy encoding by entropy encoding unit 56, the encoded bitstream may be transmitted to a video decoder, such as video decoder 30, or archived for later transmission or retrieval.

To perform context adaptive entropy coding, entropy encoding unit 56 assigns a context to each coefficient according to a context model, which may relate to, for example, whether the values of the neighboring coefficients are non-zero. Entropy encoding unit 56 also determines a coding process for the coefficient associated with the assigned context in the context model. Entropy encoding unit 56 then entropy encodes the coefficients based on the assigned contexts. For example, in the case of CABAC, entropy encoding unit 56 may determine a probability estimate for a value (e.g., 0 or 1) of the coefficient associated with the assigned context in the joint context model. Entropy encoding unit 56 then updates the probability estimate associated with the assigned context in the context model based on the actual encoded value of the coefficient.

Conventionally, video encoder 20 maintains separate context models for each of the different sizes of TUs supported by the implemented video compression standard. For the HEVC standard, additional transform unit sizes, e.g., 32×32 up to 128×128, have been proposed to improve video coding efficiency, but the additional TU sizes also result in increased memory and computational requirements to maintain the context models for each of the additional transform unit sizes. In some cases, the larger TU sizes may use more contexts, which may result in increased memory and computational requirement to maintain the increased number of contexts for the larger TU sizes.

According to the techniques of this disclosure, entropy encoding unit 56 may be configured to perform entropy encoding of video coefficients using a joint context model shared between transform units having different sizes. The techniques are mostly described with respect to the entropy encoding technique of CABAC. In some cases, however, the techniques may also be applied to other context adaptive entropy coding techniques. Sharing the joint context model between two or more sizes of transform units may reduce an amount of memory necessary to store contexts and probabilities on video encoder 20. In addition, sharing a joint context model may also reduce computational costs of maintaining context models on video encoder 20, including resetting all the context models at the beginning of a video slice. In the case of CABAC, the techniques may also reduce the computation costs of continually updating probability estimates of the context models based on actual coded values of the coefficients.

In accordance with this disclosure, entropy encoding unit 56 may maintain a joint context model shared between transform units having different sizes, and select contexts for coefficients associated with one of the transform units according to the joint context model. Entropy encoding unit 56 may then entropy encode the significant coefficients within the transform units based on the selected contexts. As an example, the joint context model may be shared between transform units having a first size of 32×32 and transform units having a second size of 16×16. In some cases, more than two sizes of transform units may share the same joint context model. In one example, the joint context model may be the joint context model of significance maps for the transform units. In other examples, the joint context model may be associated with other coding information or syntax elements. The CABAC encoding process using joint context models is described in more detail with respect to FIG. 5.

In one example, entropy encoding unit 56 may maintain a joint context model shared by a TU having the first size with coefficients that are zeroed out to generate a retained coefficient block and a TU originally having the second size. In some cases, the retained coefficient block may have a size equal to the second size. For example, when the high frequency coefficients are zeroed out of the TU of the first size, the coefficients included in a retained coefficient block of the second size have similar probability statistics as coefficients included in the TU originally of the second size. In this case, when a retained coefficient block of the second size has been generated by zeroing out coefficients of the TU originally of the first size, entropy encoding unit 56 may select contexts for the coefficients of the retained coefficient block according to the joint context model. Entropy encoding unit 56 then entropy encodes the significant coefficients within the retained coefficient block based on the selected contexts. In the case of CABAC, entropy encoding unit 56 also updates probability estimates associated with the selected contexts in the joint context model based on actual coded values of the coefficients.

In another example, entropy encoding unit 56 may maintain a joint context model shared by a first TU having the first size and a second TU having the second size. In some cases, the coefficients included in the first TU having the first size may have similar probability statistics as coefficients included in the second TU having the second size even without zeroing out the high frequency coefficients within the first TU. This is possible because the high frequency coefficients may represent so little residual video data that the effect on the probability statistics of neighboring coefficients for entropy coding is negligible. In this example, entropy encoding unit 56 may select contexts for the coefficients within the TU of one of the first and second size according to the joint context model. Entropy encoding unit 56 then entropy encodes the significant coefficients within the TU based on the selected contexts. In the case of CABAC, entropy encoding unit 56 may then update probability estimates associated with the selected contexts in the joint context model based on actual coded values of the coefficients.

Entropy encoding unit 56 may also entropy encode the syntax elements indicating the motion vectors and the other prediction information for the video block being coded. For example, entropy encoding unit 56 may entropy encode syntax elements indicating a significance map, i.e., a map of ones and zeros indicating position of significant coefficients in a TU, using the techniques described in this disclosure. Entropy encoding unit 56 may also construct header information that includes appropriate syntax elements generated by motion compensation unit 44 for transmission in the encoded bitstream. Video encoder 20 may entropy encode syntax elements indicating video block information including sizes of CUs, PUs, and TUs, and motion vector information for intra-mode prediction. To entropy encode the syntax elements, entropy encoding unit 56 may perform CABAC by binarizing the syntax elements into one or more binary bits and selecting contexts for each binary bit according to a context model.

Inverse quantization unit 58 and inverse transform processing unit 60 apply inverse quantization and inverse transformation, respectively, to reconstruct the residual block in the pixel domain for later use as a reference block of a reference frame. Summation unit 62 adds the reconstructed residual block to the predictive block generated by motion compensation unit 44 to produce a reference block for storage in reference frame memory 64. The reference block may be used by motion estimation unit 42 and motion compensation unit 44 as a reference block to inter-predict a block in a subsequent video frame.

Figure 3B:
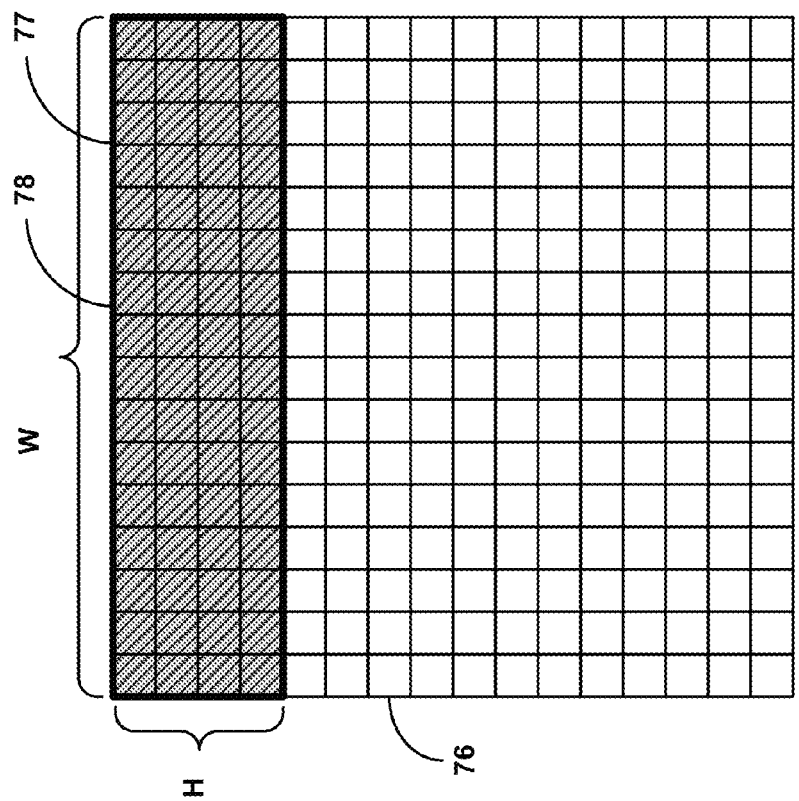
FIGS. 3A and 3B are conceptual diagrams respectively illustrating square and rectangular areas of retained coefficient blocks having a second size from a transform unit having a first size.
Figure 3A:
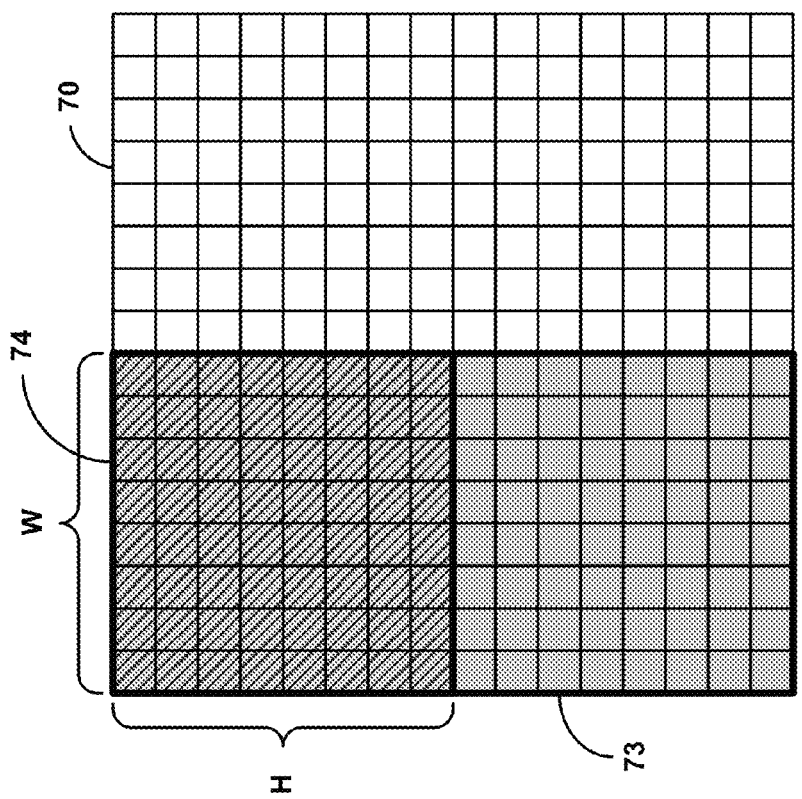

FIGS. 3A and 3B are conceptual diagrams respectively illustrating square and rectangular areas of retained coefficient blocks having a second size within a transform unit having a first size. In the conceptual illustrations of FIGS. 3A and 3B, the different boxes represent transform coefficients within a TU after application of a transform. The coefficients within the hatch-marked areas comprise the retained transform coefficients, and the coefficients not included in the hatch-marked areas (i.e., white or shaded boxes) comprise coefficients that have been zeroed out during the two-dimensional transform.

As described above, the techniques of this disclosure reduce the intermediate buffering requirements for larger TU sizes, e.g., 32×32 up to 128×128, by zeroing out a high frequency subset of transform coefficients included in a TU of a first size after each direction of a two-dimensional transform. In this way, transform processing unit 52 from FIG. 2 may generate a retained coefficient block within the TU that has a second size smaller than the first size of the TU.

The process of zeroing out comprises setting values of a subset of transform coefficients within the TU equal to zero. The transform coefficients that are zeroed out are not computed or discarded; instead, the zeroed-out transform coefficients are simply set equal to zero and have no value to store or encode. According to this disclosure, the zeroed-out transform coefficients are typically high frequency transform coefficients relative to the retained transform coefficients in the TU. High frequency transform coefficients represent residual video data that corresponds to very small pixel differences between the video block to be encoded and the predictive block. The high frequency transform coefficients, therefore, may contain so little residual video data that setting the values equal to zero has a negligible effect on decoded video quality.

FIG. 3A illustrates a TU 70 having a first size of 16×16 and a retained coefficient block 74 having a final square area of second size 8×8 within TU 70. A size and shape of the retained coefficient block 74 may be selected based on coding complexity requirements for the coding process. In this example, transform processing unit 52 from FIG. 2 may be configured to generate retained coefficient block 74 with a square area of size 8×8 within TU 70 originally of size 16×16. In order to generate retained coefficient block 74, transform processing unit 52 may zero-out half of the higher frequency coefficients after applying each direction, i.e., rows and columns, of a two-dimensional transform. In other cases, transform processing unit 52 may be configured to zero out a larger or smaller subset of the coefficients depending on coding complexity requirements for the coding process.

First, transform processing unit 52 may apply a one-dimensional transform to rows of the residual video data in TU 70, and zero-out a subset (in this case half) of the intermediate transform coefficients output from the transform. In the illustrated example of FIG. 3A, the retained intermediate transform coefficients are included in a retained intermediate coefficient block 73 (i.e., the shaded blocks in TU 70), which has a rectangular area of 16×8 equal to half of the original 16×16 size of TU 70. The zeroed-out subset (i.e., the white blocks in TU 70) may include coefficients with frequency values that are higher than the coefficients within the retained intermediate coefficient block 73 of TU 70. In the illustrated example, transform processing unit 52 zeroes-out half of the coefficients with the 8 highest frequency values in each row of TU 70. This zero-out process results in retained intermediate coefficient block 73 with a rectangular area of 16×8 within TU 70. In other examples, the area of retained intermediate coefficient block 73 may comprise a different size or shape. Transform processing unit 52 may zero-out half of the coefficients with the highest frequency values among all of the coefficients in the 16×16 TU 70. This zero-out process may lead to a retained intermediate coefficient block with a triangular area in the upper left corner of TU 70.

By zeroing out half of the intermediate transform coefficients output from the transform in the first direction, video encoder 20 only needs to buffer the coefficients within retained intermediate coefficient block 73 before applying the transform in the second direction. The coefficients within the zeroed-out subset (i.e., the white blocks in TU 70) have no value to store, transform, or encode. In this way, the techniques may reduce intermediate buffering requirements when performing two-dimensional transforms. This may be especially useful for larger transform unit sizes, e.g., 32×32 up to 128×128, that have been proposed for the HEVC standard.

After buffering, transform processing unit 52 may then apply the one-dimensional transform to columns of the retained intermediate transform coefficients in retained intermediate coefficient block 73, and zero-out a subset (in this case half) of the transform coefficients output from the transform. In the illustrated example of FIG. 3A, the retained transform coefficients are included in retained coefficient block 74 (i.e., the hatch-marked blocks in TU 70), which has a square area of size 8×8 equal to one-quarter of the original 16×16 size of TU 70. The zeroed-out subset (i.e., the non-hatch-marked squares in retained intermediate coefficient block 73) may include coefficients with frequency values that are higher than the coefficients within retained coefficient block 74 of TU 70. In the illustrated example, transform processing unit 52 zeroes-out half of the coefficients with the 8 highest frequency values in each column of retained intermediate coefficient block 73. In other examples, transform processing unit 52 may zero-out half of the coefficients with the highest frequency values among all of the coefficients in the 16×8 retained intermediate coefficient block 73. In either case, the zero-out process results in retained coefficient block 74 with a square area of 8×8 within TU 70.

FIG. 3B illustrates a TU 76 having a first size of 16×16 and a retained coefficient block 78 having a final rectangular area of second size 4×16 within TU 76. A size and shape of the retained coefficient block 78 may be selected based on coding complexity requirement for the coding process. More specifically, the final rectangular area of retained coefficient block 78 may be selected based on at least one of an intra-coding mode, a scan pattern, and a position of the last significant coefficient for the retained coefficient block 78.

In the illustrated example of FIG. 3B, transform processing unit 52 may be configured to generate retained coefficient block 78 with a rectangular area of size 4×16 within TU 76 originally of size 16×16. Transform processing unit 52 may first be applied to TU 76 in the direction of the shortest side (e.g., columns) of the final rectangular area of retained coefficient block 78. In order to generate retained coefficient block 78, transform processing unit 52 may zero-out three-quarters of the coefficients after applying the two-dimensional transform in the first direction (e.g., columns). In other cases, transform processing unit 52 may be configured to zero out a larger or smaller subset of the coefficients depending on coding complexity requirements for the coding process.

When a rectangular area is selected for the retained coefficient block, the techniques may provide further reduction in intermediate buffering requirements by first applying a one-dimensional transform in the direction of the shorter side (i.e., fewer retained transform coefficients) of the rectangular area. In this way, video encoder 20 may buffer less than half of the intermediate transform coefficients before application of the one-dimensional transform in the direction of the longer side of the rectangular area. In the illustrated example of FIG. 3B, the height (H) of the final rectangular area of retained coefficient block 78 is less than the width (W) of the rectangular area, so fewer intermediate transform coefficients will be retained in the vertical direction. Transform processing unit 52 may, therefore, first apply the transform to the columns of TU 76 such that video encoder 20 may buffer less than half (in this case one-quarter) of the intermediate transform coefficients before application of the transform to the rows of TU 76.

More specifically, transform processing unit 52 may apply a one-dimensional transform to columns of the residual video data in TU 76, and zero-out a subset (in this case three-quarters) of the intermediate transform coefficients output from the transform. In the illustrated example of FIG. 3B, the retained intermediate transform coefficients are included in a retained intermediate coefficient block 77 (i.e., the shaded blocks in TU 76), which has a rectangular area of 4×16 equal to one-quarter of the original 16×16 size of TU 76. The zeroed-out subset (i.e., the white blocks in TU 76) may include coefficients with frequency values that are higher than the coefficients within the retained intermediate coefficient block 77 of TU 76. In the illustrated example, transform processing unit 52 zeroes-out three-quarters of the coefficients with the 12 highest frequency values in each column of TU 76. This zero-out process results in retained intermediate coefficient block 77 with a rectangular area of 4×16 within TU 76.

By zeroing out three-quarters of the intermediate transform coefficients output from the transform in the first direction, video encoder 20 only needs to buffer the coefficients within retained intermediate coefficient block 77 before applying the transform in the second direction. The coefficients within the zeroed-out subset (i.e., the white blocks in TU 76) have no value to store, transform, or encode. In this way, the techniques may reduce intermediate buffering requirements when performing two-dimensional transforms. This may be especially useful for larger transform unit sizes, e.g., 32×32 up to 128×128, that have been proposed for the HEVC standard.

After buffering, transform processing unit 52 may then apply the one-dimensional transform to rows of the coefficients in retained intermediate coefficient block 77. In this example, transform processing unit 52 may not zero-out any of the transform coefficients output from the transform because TU 76 has already been zeroed-out to one-quarter of the original size of 16×16. In the illustrated example of FIG. 3A, the retained transform coefficients are included in retained coefficient block 78 (i.e., the hatch-marked blocks in TU 76), which has the same rectangular area of 4×16 as retained intermediate coefficient block 77. The zero-out process results in retained coefficient block 78 with a rectangular area of 4×16 within TU 70.

Figure 4:
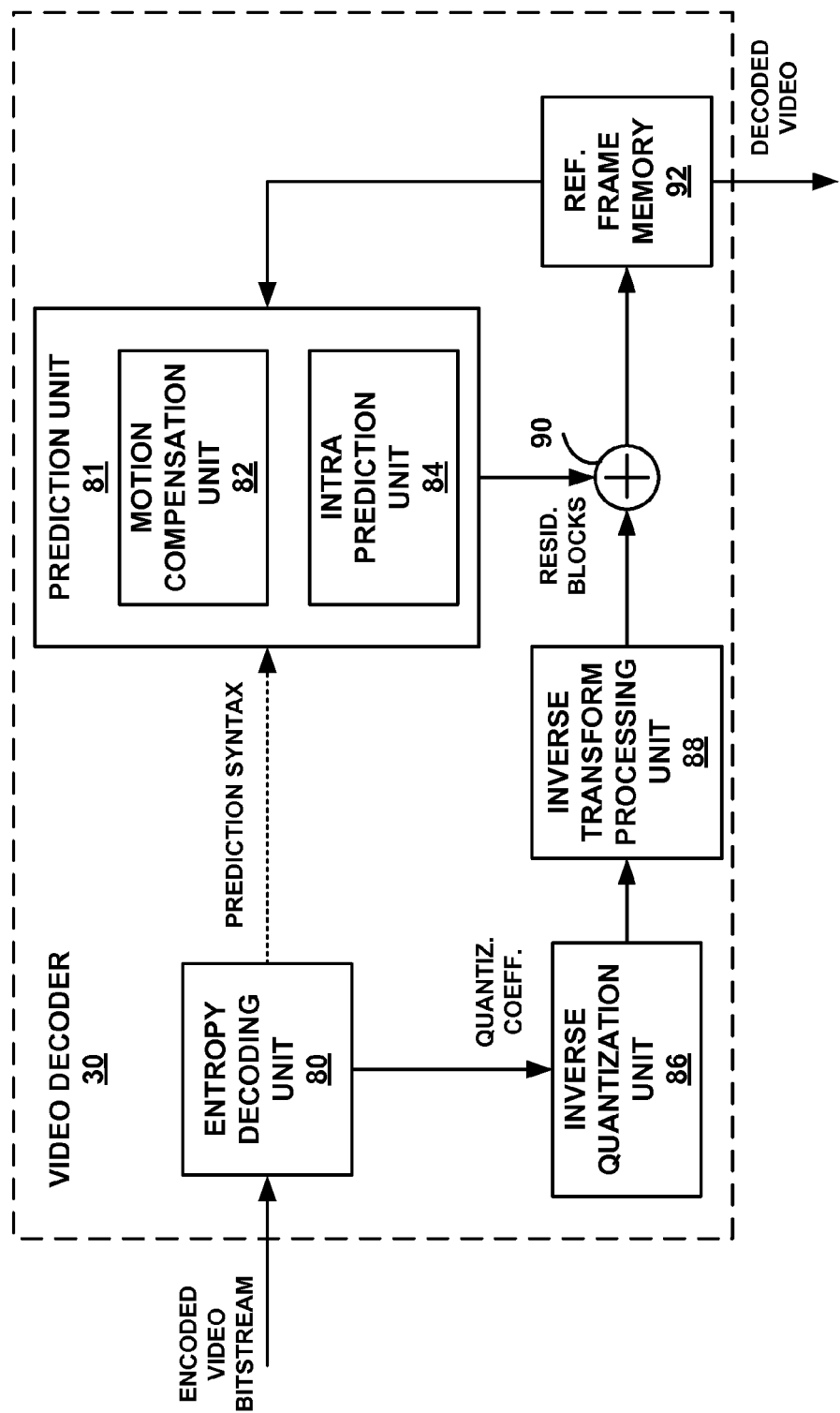
FIG. 4 is a block diagram illustrating an example video decoder that may implement techniques for entropy decoding video coefficients using a joint context model.

FIG. 4 is a block diagram illustrating an example video decoder that may implement techniques for entropy decoding video coefficients using a joint context model. In the example of FIG. 4, video decoder 30 includes an entropy decoding unit 80, prediction unit 81, inverse quantization unit 86, inverse transform processing unit 88, summation unit 90, and reference frame memory 92. Prediction unit 81 includes a motion compensation unit 82, and an intra prediction unit 84. Video decoder 30 may, in some examples, perform a decoding pass generally reciprocal to the encoding pass described with respect to video encoder 20 (FIG. 2).

During the decoding process, video decoder 30 receives an encoded video bitstream that represents an encoded video frames or slices and syntax elements that represent coding information from video encoder 20. Entropy decoding unit 80 entropy decodes the bit stream to generate quantized transform coefficients within a TU. For example, entropy decoding unit 80 may perform context adaptive entropy decoding, such as CABAC, CAVLC, or another entropy coding technique. Entropy decoding unit 80 also entropy decodes syntax elements including a significance map, i.e., a map of ones and zeros indicating position of significant coefficients in a TU, using the techniques described in this disclosure. Entropy decoding unit 80 may also entropy decode motion vectors and other prediction syntax elements.

To perform context adaptive entropy decoding, entropy decoding unit 80 assigns a context to each encoded coefficient represented in the bitstream according to a context model, which may relate to, for example, whether the values of previously decoded neighboring coefficients are non-zero. Entropy decoding unit 80 also determines a coding process for the encoded coefficient associated with the assigned context in the context model. Entropy decoding unit 80 then entropy decodes the coefficients based on the assigned contexts. In the case of CABAC, entropy decoding unit 80 determines a probability estimate for a value (e.g., 0 or 1) of the encoded coefficient associated with the assigned context in the context model. Entropy decoding unit 80 then updates the probability estimate associated with the assigned context in the context model based on the actual decoded value of the coefficient.

Conventionally, video decoder 30 must maintain separate context models for each of the different sizes of TUs supported by the implemented video compression standard. For the HEVC standard, additional transform unit sizes, e.g., 32×32 up to 128×128, have been proposed to improve video coding efficiency, but the additional TU sizes also result in increased memory and computational requirements to maintain the context models for each of the additional transform unit sizes.

According to the techniques of this disclosure, entropy decoding unit 80 may be configured to perform entropy decoding of video coefficients using a joint context model shared between transform units having different sizes. The techniques are mostly described with respect to the entropy decoding technique of CABAC. In some cases, however, the techniques may also be applied to other context adaptive entropy coding techniques. Sharing the joint context model between two or more sizes of transform units may reduce an amount of memory necessary to store contexts and probabilities on video decoder 30. In addition, sharing a joint context model may also reduce computational costs of maintaining context models on video decoder 30, including resetting all the context models at the beginning of a video slice. In the case of CABAC, the techniques may also reduce the computation costs of continually updating probability estimates of the context models based on actual coded values of the coefficients.

In accordance with this disclosure, entropy decoding unit 80 may maintain a joint context model shared between transform units having different sizes, and select contexts for coefficients associated with one of the transform units according to the joint context model. Entropy decoding unit 80 may then entropy decode the significant coefficients associated with the transform units based on the selected contexts. As an example, the joint context model may be shared between transform units having a first size of 32×32 and transform units having a second size of 16×16. In some cases, more than two sizes of transform units may share the same joint context model. In one example, the joint context model may be the joint context model of significance maps for the transform units. In other examples, the joint context model may be associated with other coding information or syntax elements. The CABAC decoding process using a joint context model is described in more detail with respect to FIG. 6.

In one example, entropy decoding unit 80 may maintain a joint context model shared by a TU having the first size with coefficients zeroed out to generate a retained coefficient block and a TU originally having the second size. In some cases, the retained coefficient block may have a size equal to the second size. For example, in this case, entropy decoding unit 80 may select contexts for the coefficients of the retained coefficient block having the second size within the TU originally having the first size according to the joint context model. Entropy decoding unit 80 then arithmetically decodes the encoded significant coefficients into the retained coefficient block within the TU having the first size based on the selected contexts. In the case of CABAC, entropy decoding unit 80 also updates probability estimates associated with the selected contexts in the joint context model based on actual decoded values of the coefficients.

In another example, entropy decoding unit 80 may maintain a joint context model shared by a first TU having the first size and a second TU having the second size. In this example, entropy decoding unit 80 may select contexts for the encoded coefficients associated with the TU of one of the first and second size according to the joint context model. Entropy decoding unit 80 then entropy decodes the encoded significant coefficients into the TU based on the selected contexts. In the case of CABAC, entropy decoding unit 80 may then update probability estimates associated with the selected contexts in the joint context model based on actual decoded values of the coefficients. In either case, entropy decoding unit 80 forwards the decoded quantized transform coefficients within TUs of either the first size or the second size to inverse quantization unit 86.

Inverse quantization unit 86 inverse quantizes, i.e., dequantizes, the quantized transform coefficients decoded into TUs by entropy decoding unit 80, as described above. The inverse quantization process may include use of a quantization parameter QP calculated by video encoder 20 for each video block or CU to determine a degree of quantization and, likewise, a degree of inverse quantization that should be applied. Inverse transform processing unit 88 applies an inverse transform, e.g., an inverse DCT, an inverse integer transform, an inverse wavelet transform, or a conceptually similar inverse transform process, to the transform coefficients within the TUs in order to produce residual video data in the pixel domain.

In some examples, inverse transform processing unit 88 may comprise a two-dimensional separable transform. Inverse transform processing unit 88 may apply the two-dimensional transform to the TU by first applying a one-dimensional inverse transform to the rows of transform coefficients within the TU, and then applying a one-dimensional inverse transform to the columns of transform coefficients within the TU, or vice versa. After application of the one-dimensional inverse transform in the first direction to the transform coefficients in the TU, video decoder 30 buffers the intermediate residual data for application of the one-dimensional inverse transform in the second direction. As described above, in the HEVC standard, larger transform unit sizes, e.g., 32×32 up to 128×128, have been proposed to improve video coding efficiency. The larger TU sizes, however, will also result in increased intermediate buffering requirements for two-dimensional transforms.

In order to reduce the intermediate buffering requirements for larger TU sizes, the techniques described in this disclosure may include zeroing out a high frequency subset of transform coefficients included in a TU with video encoder 20 from FIG. 2. The zeroed-out transform coefficients within the TU are simply set equal to zero and have no value to store, transform, or encode. Entropy decoding unit 80, therefore, receives an encoded bitstream that represents encoded coefficients associated with a retained coefficient block having a second size within the TU originally having a first size. Entropy decoding unit 80 decodes the coefficients into the retained coefficient block within the TU having the first size. The TU then includes the coefficients within the retained coefficient block of the second size, and zeros that represent the remaining coefficients within the TU.

In this way, the process of zeroing out transform coefficients in video encoder 20 may also reduce the intermediate buffering requirements for larger TU sizes when performing an inverse transform in video decoder 30. As an example, inverse transform processing unit 88 may apply a one-dimensional inverse transform in a first direction, e.g., row-wise, to the transform coefficients in a retained coefficient block having size 16×16 within a TU having size 32×32. After the row inverse transform, video decoder 30 may only need to buffer the intermediate residual data transformed from the coefficients within the retained coefficient block, which comprises only one-half of the TU, i.e., 32×16 coefficients. Inverse transform processing unit 88 may then apply the one-dimensional inverse transform in a second direction, e.g., column-wise, to the intermediate residual data in the TU. In this way, inverse transform processing unit 88 may generate the TU originally of size 32×32 by including the residual data in the retained coefficient block having size 16×16 and adding zeros to represent the remaining residual data in the TU.

Entropy decoding unit 80 also forwards decoded motion vectors and other prediction syntax elements to prediction unit 81. Video decoder 30 may receive the syntax elements at the video prediction unit level, the video coding unit level, the video slice level, the video frame level, and/or the video sequence level. When a video frame is coded as an intra-coded frame, intra prediction unit 84 of prediction unit 81 generates prediction data for video blocks of the current video frame based on data from previously decoded blocks of the current frame. When a video frame is coded as an inter-coded frame, motion compensation unit 82 of prediction unit 81 produces predictive blocks for video blocks of the current video frame based on the decoded motion vectors received from entropy decoding unit 80. The predictive blocks may be generated with respect to one or more reference blocks of a reference frame stored in reference frame memory 92.

Motion compensation unit 82 determines prediction information for a video block to be decoded by parsing the motion vectors and other prediction syntax, and uses the prediction information to generate the predictive blocks for the current video block being decoded. For example, motion compensation unit 82 uses some of the received syntax elements to determine sizes of CUs used to encode the current frame, split information that describes how each CU of the frame is split, modes indicating how each split is encoded (e.g., intra- or inter-prediction), an inter-prediction slice type (e.g., B slice, P slice, or GPB slice), reference frame list construction commands, interpolation filters applied to reference frames, motion vectors for each video block of the frame, video parameter values associated with the motion vectors, and other information to decode the current video frame.

Video decoder 30 forms a decoded video block by summing the residual blocks from inverse transform processing unit 88 with the corresponding predictive blocks generated by motion compensation unit 82. Summation unit 90 represents the component or components that perform this summation operation. If desired, a deblocking filter may also be applied to filter the decoded blocks in order to remove blockiness artifacts. The decoded video blocks are then stored in reference frames in reference frame memory 92, which provides reference blocks of reference frames for subsequent motion compensation. Reference frame memory 92 also produces decoded video for presentation on a display device, such as display device 32 of FIG. 1.

Figure 5:
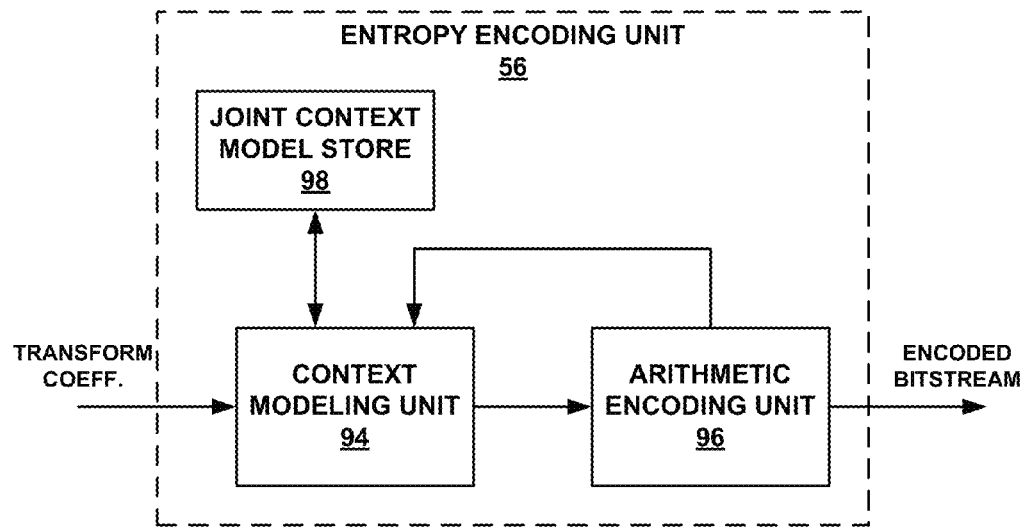
FIG. 5 is a block diagram illustrating an example entropy encoding unit configured to select contexts for video coefficients according to a joint context model.

FIG. 5 is a block diagram illustrating an example of entropy encoding unit 56 from FIG. 2 configured to select contexts for video coefficients according to a joint context model. Entropy encoding unit 56 includes a context modeling unit 94, an arithmetic encoding unit 96, and a joint context model store 98. As described above, the techniques of this disclosure are directed toward performing entropy encoding of video coefficients using a joint context model shared between transform units having different sizes. Specifically, the techniques are described herein with respect to the CABAC encoding process.

Entropy encoding unit 56 maintains a joint context model shared between transform units having different sizes within joint context model store 98. As one example, joint context model store 98 may store a joint context model shared by a TU having the first size with coefficients that are zeroed out to generate a retained coefficient block having the second size and a TU originally having the second size. As another example, joint context model store 98 may store a joint context model shared by a TU having the first size and a TU having the second size. In some cases, the first size may comprise 32×32 and the second size may comprise 16×16.

Context modeling unit 94 receives transform coefficients associated with a TU of either the first size or the second size that have been scanned into a vector for entropy encoding. Context modeling unit 94 then assigns a context to each of the coefficients of the TU based on values of previously encoded neighboring coefficients of the TU according to the joint context model. More specifically, context modeling unit 94 may assign the contexts according to whether the values of the previously encoded neighboring coefficients are non-zero. The assigned context may refer to a context index, e.g., context(i), where i=0, 1, 2, . . . , N, in the joint context model.

After a context is assigned to a coefficient, context modeling unit 94 may determine a probability estimate for a value (e.g., 0 or 1) of the coefficient associated with the assigned context in the joint context model. Each different context index is associated with a probability estimate for a value of a coefficient with that context index. The probability estimation performed for CABAC by context modeling unit 94 may be based on a table-driven estimator using a finite-state machine (FSM). For each context, the FSM maintains an associated probability estimate by tracking past context values and providing a current state as the best estimate of the probability that a given coefficient has a value of 0 or 1. For example, if the probability states range from 0 to 127 a state 0 may mean that the probability of the coefficient having a value of 0 is 0.9999, and a state 127 may mean that the probability of the coefficient having a value of 0 is 0.0001.

Arithmetic encoding unit 96 arithmetically encodes the coefficient based on the determined probability estimate of the coefficient associated with the assigned context. In this way, arithmetic encoding unit 96 generates an encoded bitstream that represents arithmetically encoded coefficients associated with the TU of either the first size or the second size according to the joint context model.

After the encoding, arithmetic encoding unit 96 feeds the actual encoded value of the coefficient back to context modeling unit 94 to update the probability estimate associated with the assigned context in the joint context model within joint context model store 98. Context modeling unit 94 performs the probability update for the assigned context in the joint context model by transitioning between probability states. For example, if the actual coded value of the coefficient is 0, then the probability that the coefficient value is equal to 0 may be increased by transitioning to a lower state. By continually updating the probability estimates of the joint context model to reflect the actual encoded values of the coefficients, the probability estimates for future coefficients assigned to the same contexts in the joint context model may be more accurate and result in further reduced bit encoding by arithmetic encoding unit 96.

In a first example, joint context model store 98 may store a joint context model shared by a TU having the first size with coefficients zeroed out to generate a retained coefficient block having the second size and a TU originally having the second size. For example, joint context model store 98 may store a joint context model shared by retained coefficient blocks having size 16×16 within TUs originally having size 32×32 and TUs originally having size 16×16.

A first coefficient within a retained coefficient block of size 16×16 within a first TU of size 32×32 may be assigned context(5) in a joint context model shared by the TU of size 32×32 with coefficients zeroed out to generate the retained coefficient block of size 16×16 and a TU of size 16×16. Context modeling unit 94 then determines a probability estimate for a value of the first coefficient associated with assigned context(5) in the joint context model, and updates the probability estimate associated with assigned context(5) in the joint context model based on an actual encoded value of the first coefficient. A second coefficient within a second TU of size 16×16 may also be assigned the same context(5) in the joint context model as the coefficient in the retained coefficient block within the first TU. Context modeling unit 94 then determines a probability estimate for a value the second coefficient associated with the same assigned context(5) in the joint context model, and updates the probability estimate associated with the same assigned context(5) in the joint context model based on an actual encoded value of the second coefficient.

In a second example, joint context model store 98 may store a joint context model shared by a TU having a first size and a TU having a second size. For example, joint context model store 98 may store a joint context model shared by TUs having sizes 32×32 and 16×16. A first coefficient within a first TU of size 32×32 may be assigned context(5) in a joint context model shared by TUs of size 32×32 and 16×16. Context modeling unit 94 then determines a probability estimate for a value the first coefficient associated with the assigned context(5) in the joint context model, and updates the probability estimate associated with the assigned context(5) in the joint context model based on an actual encoded value of the first coefficient. A second coefficient within a second TU of size 16×16 may also be assigned the same context(5) in the joint context model as the coefficient in the first TU. Context modeling unit 94 then determines a probability estimate for a value the second coefficient associated with the same assigned context(5) in the joint context model, and updates the probability estimate associated with the same assigned context(5) in the joint context model based on an actual encoded value of the second coefficient.

Figure 6:
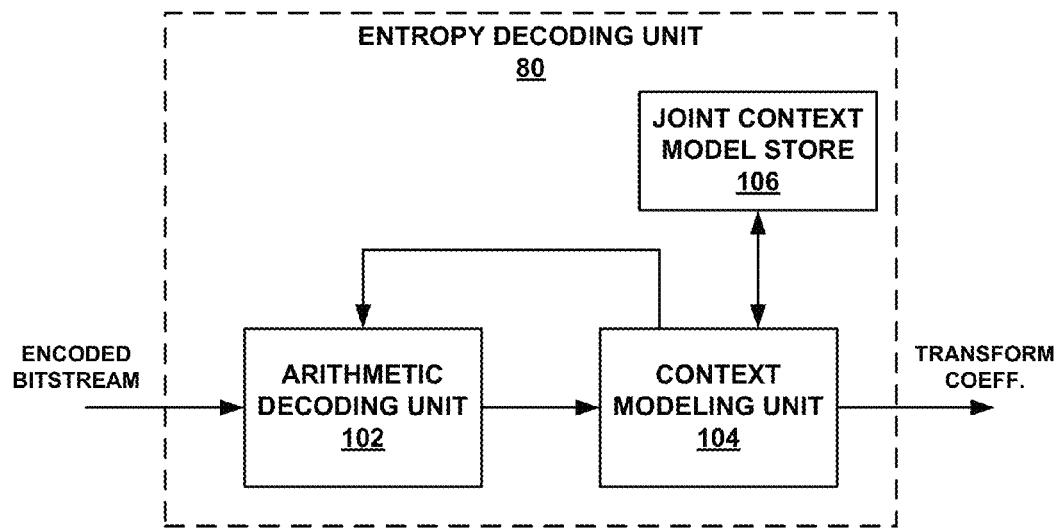
FIG. 6 is a block diagram illustrating an example entropy decoding unit configured to select contexts for video coefficients according to a joint context model.

FIG. 6 is a block diagram illustrating an example of entropy decoding unit 80 configured to select contexts for video coefficients according to a joint context model. Entropy decoding unit 80 includes an arithmetic encoding unit 102, a context modeling unit 104, and a joint context model store 106. As described above, the techniques of this disclosure are directed toward performing entropy decoding of video coefficients using a joint context model shared between transform units having different sizes. Specifically, the techniques are described herein with respect to the CABAC decoding process. Entropy decoding unit 80 may operate in a manner essentially symmetrical to that of entropy encoding unit 56 from FIG. 5.

Entropy decoding unit 80 maintains a joint context model shared between transform units having different sizes within joint context model store 106. The joint context model stored within joint context model store 106 are substantially similar to the joint context model stored in joint context model store 98 in entropy encoding unit 56 from FIG. 5. As one example, joint context model store 106 may store a joint context model shared by a TU having the first size with coefficients zeroed out to generate a retained coefficient block having the second size and a TU originally having the second size. As another example, joint context model store 106 may store a joint context model shared by a TU having the first size and a TU having the second size. In some cases, the first size may comprise 32×32 and the second size may comprise 16×16.

Arithmetic decoding unit 102 receives an encoded bitstream that represents encoded transform coefficients associated with a TU of either the first size or the second size. Arithmetic decoding unit 102 decodes the first coefficient included in the bit stream. Context modeling unit 104 then assigns a context to a subsequent encoded coefficient included in the bit stream based on the value of the first decoded coefficient. In a similar manner, context modeling unit 104 assigns a context to each of the encoded coefficients included in the bit stream based on values of previously decoded neighboring coefficients of the TU according to the joint context model. More specifically, context modeling unit 104 may assign the contexts according to whether the values of the previously decoded neighboring coefficients are non-zero. The assigned context may refer to a context index in the joint context model.

After a context is assigned to an encoded coefficient, context modeling unit 104 may determine a probability estimate for a value (e.g., 0 or 1) of the encoded coefficient associated with the assigned context in the joint context model. Each different context index is associated with a probability estimate. Context modeling unit 104 feeds the determined probability estimate of the encoded coefficient back to arithmetic decoding unit 102. Arithmetic decoding unit 102 then arithmetically decodes the encoded coefficient based on the determined probability estimate of the coefficient associated with the assigned context. In this way, arithmetic decoding unit 102 generates decoded transform coefficients within the TU of either the first size or the second size according to the joint context model.

After the decoding, arithmetic decoding unit 102 feeds the actual decoded value of the coefficient to context modeling unit 104 to update the probability estimate associated with the assigned context in the joint context model within joint context model store 106. By continually updating the probability estimates of the joint context model to reflect the actual decoded values of the coefficients, the probability estimates for future coefficients assigned to the same contexts in the joint context model may be more accurate and result in further reduced bit decoding by arithmetic decoding unit 102.

In a first example, joint context model store 106 may store a joint context model shared by a TU having the first size with coefficients zeroed out to generate a retained coefficient block having the second size and a TU originally having the second size. For example, joint context model store 106 may store a joint context model shared by the retained coefficient block having size 16×16 within the TU originally having size 32×32 and the TU originally having size 16×16.

A first encoded coefficient associated with a retained coefficient block of size 16×16 within a first TU of size 32×32 may be assigned context(5) in a joint context model shared by the TU of size 32×32 with coefficients zeroed out to generate the retained coefficient block having size 16×16 and the TU of size 16×16. Context modeling unit 104 then determines a probability estimate for a value of the first encoded coefficient associated with the assigned context(5) in the joint context model, and updates the probability estimate associated with the assigned context(5) in the joint context model based on an actual decoded value of the first coefficient. A second encoded coefficient associated with a second TU of size 16×16 may be assigned the same context(5) in the joint context model as the first encoded coefficient associated with the retained coefficient block within the first TU. Context modeling unit 104 then determines a probability estimate for a value of the second encoded coefficient associated with the same assigned context(5) in the joint context model, and updates the probability estimate associated with the same assigned context(5) in the joint context model based on an actual decoded value of the second coefficient.

In a second example, joint context model store 106 may store a joint context model shared by a TU having a first size and a TU having a second size. For example, joint context model store 106 may store a joint context model shared by TUs having sizes 32×32 and 16×16. A first encoded coefficient associated with a first TU of size 32×32 may be assigned context(5) in a joint context model shared by the TU of size 32×32 and the TU of size 16×16. Context modeling unit 104 then determines a probability estimate for a value of the first encoded coefficient associated with the assigned context(5) in the joint context model, and updates the probability estimate associated with the assigned context(5) in the joint context model based on an actual decoded value of the first coefficient. A second encoded coefficient associated with the second TU of size 16×16 may be assigned the same context(5) in the joint context model as the first encoded coefficient associated with the first TU. Context modeling unit 104 then determines a probability estimate for a value of the second encoded coefficient associated with the same assigned context(5) in the joint context model, and updates the probability estimate associated with the same assigned context(5) in the joint context model based on an actual decoded value of the second coefficient.

Figure 7:
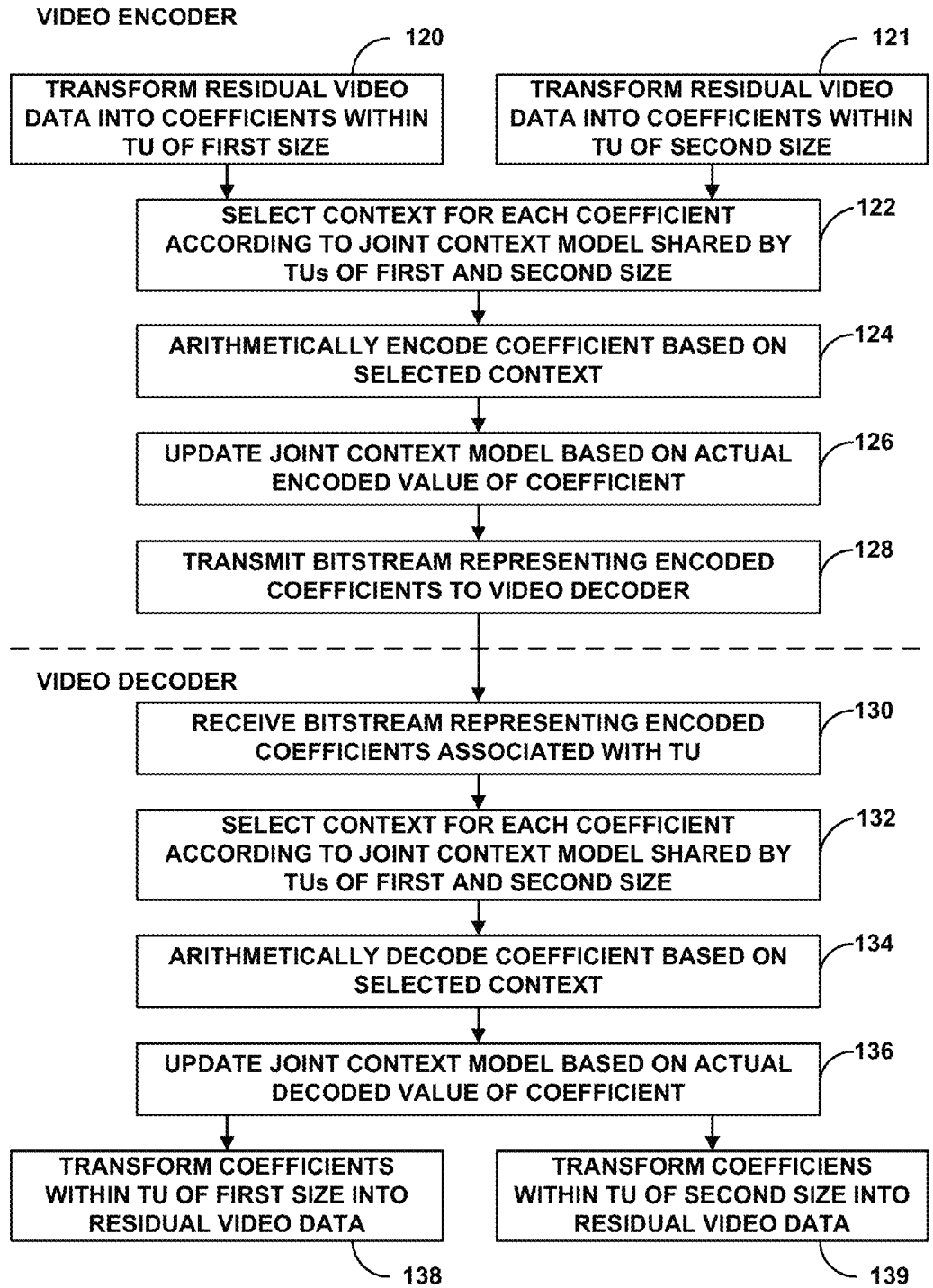
FIG. 7 is a flowchart illustrating an example operation of entropy encoding and entropy decoding video coefficients using a joint context model shared between a first transform unit having a first size and a second transform unit having a second size.

FIG. 7 is a flowchart illustrating an example operation of entropy encoding and decoding video coefficients using a joint context model shared between a first transform unit having a first size and a second transform unit having a second size. The illustrated operation is described with reference to entropy encoding unit 56 of FIG. 5 within video encoder 20 of FIG. 2 and entropy decoding unit 80 of FIG. 6 within video decoder 30 of FIG. 3, although other devices may implement similar techniques.

In the illustrated operation, entropy encoding unit 56 within video encoder 20 and entropy encoding unit 80 within video decoder 30 may maintain a joint context model shared by a TU having a first size and a TU having a second size. In this case, the coefficients included in the first TU having the first size, e.g., 32×32, may have similar probability statistics as coefficients included in the second TU of the second size, e.g., 16×16, even without zeroing out the high frequency coefficients within the first TU. This may be possible when the high frequency coefficients represent so little residual video data that the effect on the probability statistics of neighboring coefficients for entropy coding is negligible.

In one case, video encoder 20 may use transform processing unit 52 to transform residual video data into transform coefficients within the TU having the first size (120). In another case, video encoder 20 may use transform processing unit 52 to transform residual video data into transform coefficients within the TU having the second size (121). Regardless of whether the TU is of the first size or the second size, the techniques of this disclosure enable entropy encoding unit 56 to entropy encode coefficients within the TU according to the same joint context model. The techniques, therefore, reduce an amount of memory necessary to store contexts and probabilities on video encoder 20, and reduce computational costs of maintaining context models on video encoder 20.

Context modeling unit 94 within entropy encoding unit 56 selects a context for each coefficient within the TU according to the joint context model shared by TUs having both the first size and the second size (122). More specifically, context modeling unit 94 assigns a context to a given coefficient of the TU based on values of previously encoded neighboring coefficients of the TU according to the joint context model. Context modeling unit 94 then may determine a probability estimate for a value (e.g., 0 or 1) of the coefficient associated with the assigned context in the joint context model within joint context model store 98. Arithmetic encoding unit 96 next arithmetically encodes the coefficient based on the selected context for the coefficient (124).

After encoding, arithmetic encoding unit 96 feeds the actual encoded values of the coefficients back to context modeling unit 94. Context model unit 94 may then update the probability estimate of the joint context model based on actual encoded values of the coefficients within the TU of either the first size or the second size (126). Video encoder 20 transmits a bitstream representing encoded coefficients associated with the TU of either the first size or the second size to video decoder 30 (128).

Video decoder 30 may receive the bitstream that represents the encoded coefficients associated with the TU having either the first size or the second size (130). Regardless of whether the TU is of the first size or the second size, the techniques of this disclosure enable entropy decoding unit 80 to entropy decode coefficients associated with the TU based on the same joint context model. The techniques, therefore, may reduce an amount of memory necessary to store contexts and probabilities on video decoder 30, and reduce computational costs of maintaining context models on video decoder 30.

Context modeling unit 104 within entropy decoding unit 80 selects a context for each encoded coefficient associated with the TU according to the joint context model shared by TUs having both the first size and the second size (132). More specifically, context modeling unit 104 may assign a context to a subsequent encoded coefficient associated with the TU based on values of previously decoded neighboring coefficients of the TU according to the joint context model. Context modeling unit 104 then may determine a probability estimate for a value (e.g., 0 or 1) of the encoded coefficient associated with the assigned context in the joint context model within joint context model store 106. Context modeling unit 104 feeds the determined probability estimate associated with the selected context for the encoded coefficient back to arithmetic encoding unit 102. Arithmetic encoding unit 102 next arithmetically decodes the encoded coefficient into the TU of either the first size or the second size based on the selected context (134).

After decoding, arithmetic decoding unit 102 feeds the actual decoded values of the coefficients to context modeling unit 104. Context model unit 104 may then update the probability estimate of the joint context model based on actual decoded values of the coefficients within the TU of either the first size or the second size (136). In one case, video decoder 30 may use inverse transform processing unit 88 to inverse transform the coefficients within the TU having the first size into residual video data (138). In another case, video decoder 30 may use inverse transform processing unit 88 to inverse transform the coefficients within the TU having the second size into residual video data (139).

Figure 8:
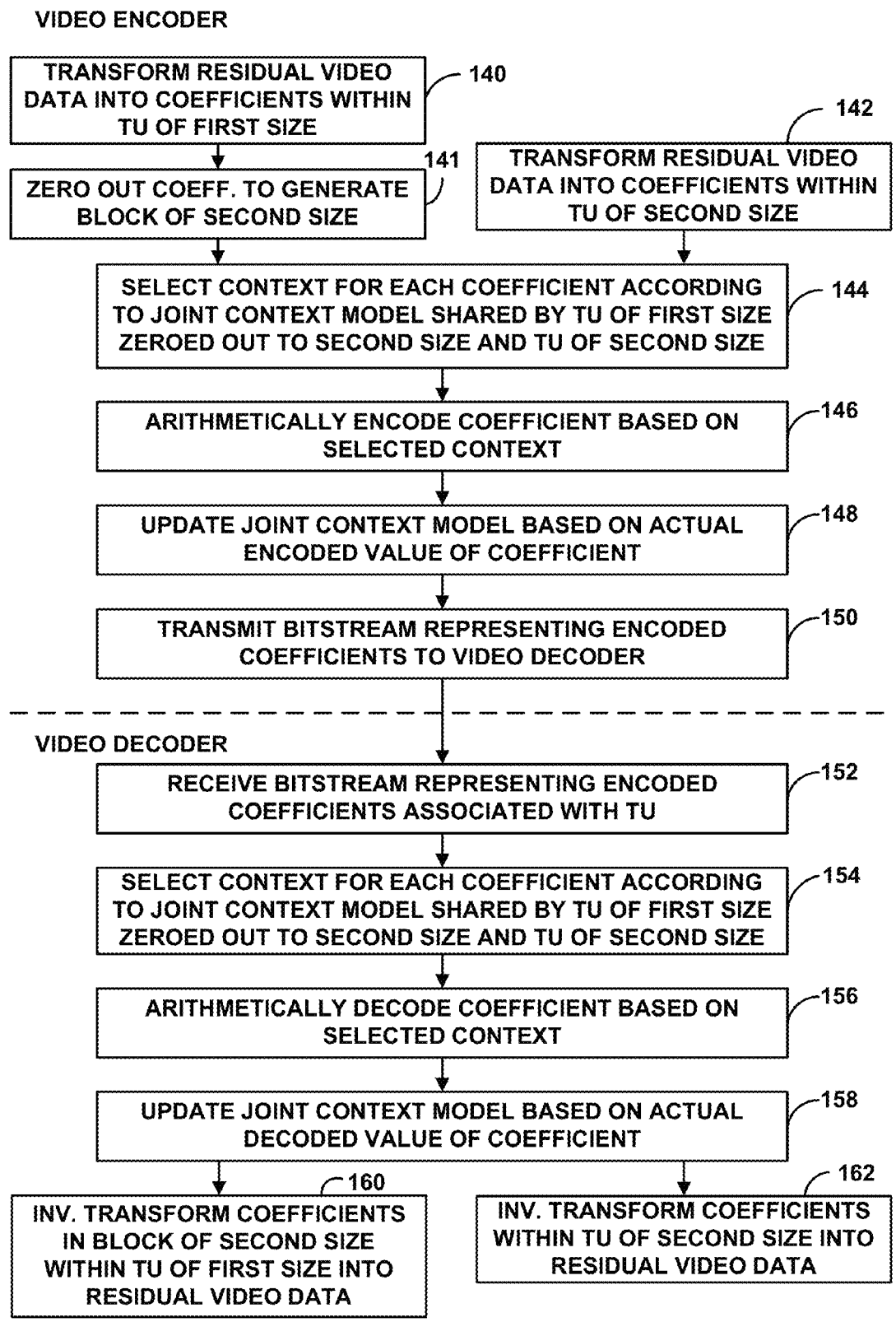
FIG. 8 is a flowchart illustrating an example operation of entropy encoding and decoding video coefficients using a joint context model shared between a first transform unit having a first size with coefficients zeroed out to generate a retained coefficient block having a second size and a second transform unit having the second size.

FIG. 8 is a flowchart illustrating an example operation of entropy encoding and decoding video coefficients using a joint context model shared between a first transform unit having a first size with coefficients zeroed out to generate a retained coefficient block having a second size and a second transform unit having the second size. The illustrated operation is described with reference to entropy encoding unit 56 of FIG. 4 within video encoder 20 of FIG. 2 and entropy decoding unit 80 of FIG. 5 within video decoder 30 of FIG. 3, although other devices may implement similar techniques.

In the illustrated operation, entropy encoding unit 56 within video encoder 20 and entropy encoding unit 80 within video decoder 30 may maintain a joint context model shared by a TU having a first size with coefficient zeroed out to generate a retained coefficient block having a second size, and a TU having the second size. In this case, the coefficients included in the retained coefficient block having the second size, e.g., 16×16, within the first TU having the first size, e.g., 32×32, may have similar probability statistics as coefficients included in the second TU of the second size, e.g., 16×16.

In one case, video encoder 20 may use transform processing unit 52 to transform residual video data into transform coefficients within a TU having the first size (140). Video encoder 20 zeroes out a subset of coefficients included in the first TU after the transform to generate the retained coefficient block having the second size within the first TU (141). The subset of zeroed out transform coefficients typically includes high frequency transform coefficients relative to the coefficients within the retained coefficient block. The high frequency transform coefficients may contain so little residual video data that setting the values equal to zero has a negligible effect on decoded video quality. In another case, video encoder 20 may use transform processing unit 52 to transform residual video data into transform coefficients within a TU having the second size (142).

Regardless of whether the TU is originally of the first size or the second size, the techniques of this disclosure enable entropy encoding unit 56 to entropy encode retained coefficients within the TU according to the same joint context model. The techniques, therefore, reduce an amount of memory necessary to store contexts and probabilities on video encoder 20, and reduce computational costs of maintaining context models on video encoder 20.

Context modeling unit 94 within entropy encoding unit 56 selects a context for each retained coefficient within the TU according to the joint context model shared by a TU having the first size with coefficients zeroed out to the second size, and a TU having the second size (144). More specifically, context modeling unit 94 assigns a context to a given coefficient within the retained coefficient block of the first TU based on values of previously encoded neighboring coefficients of the retained coefficient block according to the joint context model. Context modeling unit 94 then may determine a probability estimate for a value (e.g., 0 or 1) of the coefficient associated with the assigned context in the joint context model within joint context model store 98. Arithmetic encoding unit 96 next arithmetically encodes the coefficient based on the selected context for the coefficient (146).

After encoding, arithmetic encoding unit 96 feeds the actual encoded values of the coefficients back to context modeling unit 94. Context model unit 94 may then update the probability estimate of the joint context model based on actual encoded values of the coefficients in the retained coefficient block of the second size within the TU of the first size, or the TU originally of the second size (148). Video encoder 20 transmits a bitstream representing encoded coefficients associated with the retained coefficient block within the TU of the first size, or the TU of second size to video decoder 30 (150).

Video decoder 30 may receive the bitstream that represents the encoded coefficients associated with the retained coefficient block of the second size within the TU of the first size, or the TU originally of the second size (152). Regardless of whether the TU is of the first size or the second size, the techniques of this disclosure enable entropy decoding unit 80 to entropy decode coefficients associated with the TU based on the same joint context model. The techniques, therefore, reduce an amount of memory necessary to store contexts and probabilities on video decoder 30, and reduce computational costs of maintaining context models on video decoder 30.

Context modeling unit 104 within entropy decoding unit 80 selects a context for each coefficient associated with the TU according to the joint context model shared by the TU having the first size with coefficients zeroed out to generate the retained coefficient block having the second size, and a TU having the second size (154). More specifically, context modeling unit 104 may assign a context to a subsequent encoded coefficient associated with the retained coefficient block of the first TU based on values of previously decoded neighboring coefficients of the retained coefficient block according to the joint context model. Context modeling unit 104 then may determine a probability estimate for a value (e.g., 0 or 1) of the encoded coefficient associated with the assigned context in the joint context model within joint context model store 106. Context modeling unit 104 feeds the determined probability associated with the selected context for the encoded coefficient, back to arithmetic encoding unit 102. Arithmetic encoding unit 102 next arithmetically decodes the encoded coefficient into the retained coefficient block within the TU of the first size, or the TU of the second size based on the selected context (156).

After decoding, arithmetic decoding unit 102 feeds the actual decoded values of the coefficients to context modeling unit 104. Context model unit 104 may then update the probability estimate of the joint context model based on actual decoded values of the coefficients within the retained coefficient block of the second size within the TU of the first size, or the TU originally of the second size (158). In one case, video decoder 30 may use inverse transform processing unit 88 to inverse transform the coefficients of the retained coefficient block having the second size within the TU having the first size into residual video data (160). In this way, inverse transform processing unit 88 may generate the TU having the first size by including the residual data in the retained coefficient block having the second size, and adding zeros representing the remaining residual data in the TU. In another case, video decoder 30 may use inverse transform processing unit 88 to inverse transform the coefficients within the TU having the second size into residual video data (162).

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium.

For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of coding video data comprising:
    maintaining a plurality of context models for entropy coding transform coefficients of the video data, wherein the plurality of context models includes one or more context models that are each used for a different transform unit size and at least one joint context model used for two or more transform unit sizes;
    selecting the joint context model shared by a first transform unit having a first size and a second transform unit having a second size for entropy coding transform coefficients in one of the first transform unit or the second transform unit, wherein the first size and the second size are different, and wherein each of the transform units comprises a residual video data unit including a plurality of blocks of transform coefficients;
    selecting contexts for the transform coefficients associated with the one of the first transform unit or the second transform unit according to the joint context model, wherein selecting contexts for the transform coefficients comprises assigning a context in the joint context model to a given one of the transform coefficients based on values of previously coded neighboring transform coefficients of the one of the transform units, and determining a probability estimate for a value of the given one of the transform coefficients associated with the assigned context in the joint context model; and
    entropy coding the transform coefficients of the one of the transform units using context adaptive binary arithmetic coding (CABAC) based on the selected contexts.

2. The method of claim 1, wherein the joint context model comprises the joint context model of a significance map, further comprising:
    selecting contexts for components of the significance map for the transform coefficients associated with the one of the first transform unit or the second transform unit according to the joint context model; and
    entropy coding the components of the significance map associated with the one of the transform units based on the selected contexts.

3. The method of claim 1, further comprising updating the probability estimate associated with the assigned context in the joint context model based on actual coded values of transform coefficients of the first transform unit having the first size and the second transform unit having the second size.

4. The method of claim 1, wherein the method comprises a method of decoding video data, the method further comprising:
    receiving a bitstream that represents encoded transform coefficients associated with the one of the first transform unit having the first size or the second transform unit having the second size;
    selecting contexts for the encoded transform coefficients according to the joint context model; and
    entropy decoding the encoded transform coefficients into the one of the transform units based on the selected contexts.

5. The method of claim 4, further comprising inverse transforming the transform coefficients of the one of the first transform unit having the first size or the second transform unit having the second size into residual pixel values.

6. The method of claim 1, wherein the method comprises a method of encoding video data, the method further comprising:
    transforming residual pixel values into the transform coefficients within the one of the first transform unit having the first size or the second transform unit having the second size;
    selecting contexts for the transform coefficients of the one of the transform units according to the joint context model; and
    entropy encoding the transform coefficients of the one of the transform units based on the selected contexts.

7. The method of claim 1, wherein the first transform unit of the first size comprises a 32×32 transform unit, and wherein the second transform unit of the second size comprises a 16×16 transform unit.

8. The method of claim 1, wherein selecting contexts according to the joint context model comprises:
    assigning a context in the joint context model to a first transform coefficient of the first transform unit having the first size based on values of previously coded neighboring transform coefficients of the first transform unit;
    determining a probability estimate for a value of the first transform coefficient associated with the assigned context in the joint context model;
    updating the probability estimate associated with the assigned context in the joint context model based on an actual coded value of the first transform coefficient;

assigning the same context in the joint context model to a second transform coefficient of the second transform unit having the second size based on values of previously coded neighboring transform coefficients of the second transform unit;

determining a probability estimate for a value of the second transform coefficient associated with the same assigned context in the joint context model; and updating the probability estimate associated with the same assigned context in the joint context model based on an actual coded value of the second transform coefficient.

9. The method of claim 1, further comprising selecting one of the one or more context models for entropy coding transform coefficients in a transform unit having a third size, wherein the third size is different than the first size and the second size.

10. The method of claim 1, wherein entropy coding the transform coefficients of the one of the transform units using CABAC comprises arithmetically coding the given one of the transform coefficients based on the determined probability estimate for the value of the given one of the transform coefficients associated with the assigned context.

11. A video coding device comprising:
a memory configured to store a plurality of context models for entropy coding transform coefficients of video data, wherein the plurality of context models includes one or more context models that are each used for a different transform unit size and at least one joint context model used for two or more transform unit sizes; and
a processor configured to:
select the joint context model shared by a first transform unit having a first size and a second transform unit having a second size for entropy coding transform coefficients in one of the first transform unit or the second transform unit, wherein the first size and the second size are different, and wherein each of the transform units comprises a residual video data unit including a plurality of blocks of transform coefficients;
select contexts for the transform coefficients associated with the one of the first transform unit or the second transform unit according to the joint context model,
wherein the processor is configured to assign a context in the joint context model to a given one of the transform coefficients based on values of previously coded neighboring transform coefficients of the one of the transform units, and determine a probability estimate for a value of the given one of the transform coefficients associated with the assigned context in the joint context model, and
entropy code the transform coefficients of the one of the transform units using context adaptive binary arithmetic coding (CABAC) based on the selected contexts.

12. The video coding device of claim 11, wherein the joint context model comprises the joint context model of a significance map, wherein the processor is configured to:
select contexts for components of the significance map for the transform coefficients associated with the one of the first transform unit or the second transform unit according to the joint context model; and
entropy code the components of the significance map associated with the one of the transform units based on the selected contexts.

13. The video coding device of claim 11, wherein the processor is configured to update the probability estimate associated with the assigned context in the joint context model based on actual coded values of transform coefficients of the first transform unit having the first size and the second transform unit having the second size.

14. The video coding device of claim 11, wherein the video coding device comprises a video decoding device, wherein the processor is configured to:
receive a bitstream that represents encoded transform coefficients associated with the one of the first transform unit having the first size or the second transform unit having the second size;
select contexts for the encoded transform coefficients according to the joint context model; and
entropy decode the encoded transform coefficients into the one of the transform units based on the selected contexts.

15. The video coding device of claim 14, wherein the processor is configured to inverse transform the transform coefficients of the one of the first transform unit having the first size or the second transform unit having the second size into residual pixel values.

16. The video coding device of claim 11, wherein the video coding device comprises a video encoding device, wherein the processor is configured to:
transform residual pixel values into the transform coefficients within the one of the first transform unit having the first size or the second transform unit having the second size;
select contexts for the transform coefficients of the one of the transform units according to the joint context model; and
entropy encode the transform coefficients of the one of the transform units based on the selected contexts.

17. The video coding device of claim 11, wherein the first transform unit of the first size comprises a 32×32 transform unit, and wherein the second transform unit of the second size comprises a 16×16 transform unit.

18. The video coding device of claim 11, wherein the processor is configured to:
assign a context in the joint context model to a first transform coefficient of the first transform unit having the first size based on values of previously coded neighboring transform coefficients of the first transform unit;
determine a probability estimate for a value of the first transform coefficient associated with the assigned context in the joint context model;
update the probability estimate associated with the assigned context in the joint context model based on an actual coded value of the first transform coefficient;
assign the same context in the joint context model to a second transform coefficient of the second transform unit having the second size based on values of previously coded neighboring transform coefficients of the second transform unit;
determine a probability estimate for a value of the second transform coefficient associated with the same assigned context in the joint context model; and
update the probability estimate associated with the same assigned context in the joint context model based on an actual coded value of the second transform coefficient.

19. The video coding device of claim 11, wherein the processor is configured to select one of the one or more context models for entropy coding transform coefficients in a transform unit having a third size, wherein the third size is different than the first size and the second size.

20. The video coding device of claim 11, wherein the processor is configured to arithmetically coding the given one of the transform coefficients based on the determined probability estimate for the value of the one of the transform coefficients associated with the assigned context.

21. A video coding device comprising:
  means for maintaining a plurality of context models for entropy coding transform coefficients of video data, wherein the plurality of context models includes one or more context models that are each used for a different transform unit size and at least one joint context model used for two or more transform unit sizes;
  means for selecting the joint context model shared by a first transform unit having a first size and a second transform unit having a second size for entropy coding transform coefficients in one of the first transform unit or the second transform unit, wherein the first size and the second size are different, and wherein each of the transform units comprises a residual video data unit including a plurality of blocks of transform coefficients;
  means for selecting contexts for the transform coefficients associated with the one of the first transform unit or the second transform unit according to the joint context model, wherein the means for selecting contexts for the transform coefficients comprise means for assigning a context in the joint context model to a given one of the transform coefficients based on values of previously coded neighboring transform coefficients of the one of the transform units, and means for determining a probability estimate for a value of the given one of the transform coefficients associated with the assigned context in the joint context model; and
  means for entropy coding the transform coefficients of the one of the transform units using context adaptive binary arithmetic coding (CABAC) based on the selected contexts.

22. The video coding device of claim 21, wherein the joint context model comprises the joint context model of a significance map, further comprising:
  means for selecting contexts for components of the significance map for the transform coefficients associated with the one of the first transform unit or the second transform unit according to the joint context model; and
  means for entropy coding the components of the significance map associated with the one of the transform units based on the selected contexts.

23. The video coding device of claim 21, further comprising means for updating the probability estimate associated with the assigned context in the joint context model based on actual coded values of transform coefficients of the first transform unit having the first size and the second transform unit having the second size.

24. The video coding device of claim 21, wherein the video coding device comprises a video decoding device, further comprising:
  means for receiving a bitstream that represents encoded transform coefficients associated with the one of the first transform unit having the first size or the second transform unit having the second size;
  means for selecting contexts for the encoded transform coefficients according to the joint context model; and
  means for entropy decoding the encoded transform coefficients into the one of the transform units based on the selected contexts.

25. The video coding device of claim 24, further comprising means for inverse transforming the transform coefficients of the one of the first transform unit having the first size or the second transform unit having the second size into residual pixel values.

26. The video coding device of claim 21, wherein the video coding device comprises a video encoding device, further comprising:
  means for transforming residual pixel values into the transform coefficients within the one of the first transform unit having the first size or the second transform unit having the second size;
  means for selecting contexts for the transform coefficients of the one of the transform units according to the joint context model; and
  means for entropy encoding the transform coefficients of the one of the transform units based on the selected contexts.

27. The video coding device of claim 21, wherein the first transform unit of the first size comprises a 32×32 transform unit, and wherein the second transform unit of the second size comprises a 16×16 transform unit.

28. A non-transitory computer-readable medium comprising instructions for coding video data that, when executed, cause a processor to:
  maintain a plurality of context models for entropy coding transform coefficients of the video data, wherein the plurality of context models includes one or more context models that are each used for a different transform unit size and at least one joint context model used for two or more transform unit sizes;
  select a joint context model shared by a first transform unit having a first size and a second transform unit having a second size for entropy coding transform coefficients in one of the first transform unit or the second transform unit, wherein the first size and the second size are different, and wherein each of the transform units comprises a residual video data unit including a plurality of blocks of transform coefficients;
  select contexts for coefficients associated with the one of the first transform unit or the second transform unit according to the joint context model, wherein the instructions further cause the processor to assign a context in the joint context model to a given one of the transform coefficients based on values of previously coded neighboring transform coefficients of the one of the transform units, and determine a probability estimate for a value of the given one of the transform coefficients associated with the assigned context in the joint context model; and
  entropy code the transform coefficients of the one of the transform units using context adaptive binary arithmetic coding (CABAC) based on the selected contexts.

29. The non-transitory computer-readable medium of claim 28, wherein the joint context model comprises the joint context model of a significance map, further comprising instructions that cause the processor to:
  select contexts for components of the significance map for the transform coefficients associated with the one of the first transform unit or the second transform unit according to the joint context model; and
  entropy code the components of the significance map associated with the one of the transform units based on the selected contexts.

30. The non-transitory computer-readable medium of claim 28, wherein the instructions cause the processor to:
  update the probability estimate associated with the assigned context in the joint context model based on actual coded values of transform coefficients of the first transform unit having the first size and the second transform unit having the second size.

31. The non-transitory computer-readable medium of claim 28, wherein the instruction comprises instructions for decoding video data, further comprising instructions that cause the processor to:

receive a bitstream that represents encoded transform coefficients associated with the one of the first transform unit having the first size or the second transform unit having the second size;

select contexts for the encoded transform coefficients according to the joint context model; and entropy decode the encoded transform coefficients into the one of the transform units based on the selected contexts.

32. The non-transitory computer-readable medium of claim 31, further comprising instructions that cause the processor to inverse transform the transform coefficients of the one of the first transform unit having the first size or the second transform unit having the second size into residual pixel values.

33. The non-transitory computer-readable medium of claim 28, wherein the instructions comprise instructions for encoding video data, further comprising instructions that cause the processor to:

transform residual pixel values into transform coefficients within the one of the first transform unit having the first size or the second transform unit having the second size;

select contexts for the transform coefficients of the one of the transform units according to the joint context model; and entropy encode the transform coefficients of the one of the transform units based on the selected contexts.

34. The non-transitory computer-readable medium of claim 28, wherein the first transform unit of the first size comprises a 32×32 transform unit, and wherein the second transform unit of the second size comprises a 16×16 transform unit.

\* \* \* \* \*